(12) United States Patent
Hu

(10) Patent No.: US 11,682,903 B2
(45) Date of Patent: Jun. 20, 2023

(54) BUILDING LOAD MODIFICATION RESPONSIVE TO UTILITY GRID EVENTS USING ROBOTIC PROCESS AUTOMATION

(71) Applicant: PEAK POWER, INC., Toronto (CA)

(72) Inventor: Benson Pei Sen Hu, Markham (CA)

(73) Assignee: Peak Power, Inc., Toronto (CA)

( * ) Notice: Subject to any disclaimer, the term of this patent is extended or adjusted under 35 U.S.C. 154(b) by 0 days.

(21) Appl. No.: 17/979,043

(22) Filed: Nov. 2, 2022

(65) Prior Publication Data

US 2023/0046988 A1 Feb. 16, 2023

Related U.S. Application Data

(63) Continuation of application No. 17/236,582, filed on Apr. 21, 2021, now Pat. No. 11,522,364.

(51) Int. Cl.
*H02J 3/12* (2006.01)
*G05B 13/04* (2006.01)
*H02J 13/00* (2006.01)
*G05B 13/02* (2006.01)

(52) U.S. Cl.
CPC ............ *H02J 3/12* (2013.01); *G05B 13/0265* (2013.01); *G05B 13/042* (2013.01); *G05B 13/048* (2013.01); *H02J 13/00006* (2020.01)

(58) Field of Classification Search
CPC .. H02J 3/12; H02J 13/00006; G05B 13/0265; G05B 13/042; G05B 13/048
See application file for complete search history.

(56) References Cited

U.S. PATENT DOCUMENTS

| 4,341,345 | A | 7/1982 | Hammer et al. |
|---|---|---|---|
| 9,555,544 | B2 | 1/2017 | Bataller et al. |
| 2003/0023952 | A1 | 1/2003 | Harmon, Jr. |
| 2012/0323393 | A1 | 12/2012 | Imhof et al. |
| 2014/0316743 | A1 | 10/2014 | Drees et al. |
| 2018/0259949 | A1 | 9/2018 | Przybylski et al. |
| 2019/0028297 | A1 | 1/2019 | Fairweather et al. |
| 2019/0079473 | A1 | 3/2019 | Kumar et al. |
| 2021/0055944 | A1 | 2/2021 | Hinton et al. |

OTHER PUBLICATIONS

Foreign Search Report on PCT PCT/IB2022/052500 dated Apr. 27, 2022.
Non-Final Office Action on U.S. Appl. No. 17/236,582 dated Jul. 28, 2022.
Notice of Allowance on U.S. Appl. No. 17/236,582 dated Oct. 19, 2022.

*Primary Examiner* — Christopher E. Everett
(74) *Attorney, Agent, or Firm* — Foley & Lardner LLP

(57) ABSTRACT

Responding to grid events is provided. The system determines, based on an event, to modify an electrical load of a site. The system selects a parameter for the site to adjust to modify the electrical load. The system identifies a script constructed from previously processed interactions between a human-machine interface of the building management system to adjust the parameter for the site. The system establishes a communication session with a remote access agent executed by a computing device of the site to invoke the building management system of the site. The system generates a sequence of commands defined by the script to adjust the one or more parameters for the site. The system transmits the sequence of commands to cause the remote access agent to execute the sequence of commands on the human-machine interface of the building management system to modify the electrical load of the site.

20 Claims, 7 Drawing Sheets

400

BUILDING LOAD MODIFICATION RESPONSIVE TO UTILITY GRID EVENTS USING ROBOTIC PROCESS AUTOMATION

CROSS-REFERENCES TO RELATED APPLICATIONS

This application claims the benefit of priority under 35 U.S.C. § 120 as a continuation of U.S. patent application Ser. No. 17/236,582, filed Apr. 21, 2021, which is hereby incorporated by reference herein in its entirety.

BACKGROUND

A building can receive utilities, such as electric power, from a utility provider over a utility distribution grid. Devices, components, or machines located at the building can consume various amounts of a utility, such as electric power, at various times. Due to supply constraints of a utility, or the amount of a utility that can be supplied at a specific time interval, it may be desirable to modify the utility load at a building for a specific time interval. However, due to the large number and different types of devices consuming a utility at the building, it can be challenging to efficiently and effectively modify utility consumption at the building for a time interval.

SUMMARY

Systems and methods of this technical solution are generally directed to responding to grid events by modifying a load at a building using robotic process automation. Due to increased electricity demand or decreased electricity supply on an electric distribution grid, it may be beneficial to modify or reduce the consumption of electricity at a building during a time period. For example, there may be increased demand for electricity during particular times in the day or responsive to particular grid events. However, it can be challenging to modify or reduce the consumption of electricity at a building responsive to the grid event, or proactively modify or reduce the consumption of electricity at the building ahead of the grid event, because of the large number of different types of devices or components at the building that consume electricity, or other utility, and the interactions between the different devices or components and their impacts on the building environment.

For example, a building management system ("BMS") or a building automation system can manage, control or monitor mechanical and electrical equipment, components or devices at a building, such as heating, ventilation, air conditioning, lighting, power systems, elevator systems, fire systems, or security systems. The building management system can include software and hardware and provide a user interface to manage the mechanical and electrical equipment at a building. However, it can be challenging to interface with a BMS to adjust or reduce the load at a building because of the complex user interfaces or application programming interfaces ("APIs") of different BMSs and the custom configurations at each building. For example, each building can have a custom or specific configuration with regard to types of electrical and mechanical equipment, and how the electrical and mechanical equipment impacts the building environment (e.g., heating or cooling a particular room at a particular time of day). Thus, it can be challenging to setup or configure a system to automatically respond to a grid event by reducing the load in a particular building.

Systems and methods of this technical solution can modify the load at a building in response to a grid event by using robotic process automation. This technical solution can simplify the process of automating or controlling a BMS to respond to grid event by generating scripts based on recording user interactions with a user interface of the BMS of a building, and then executing a particular script in response to a grid event. The technical solution can receive data from various sensors located at the building, as well as remote data sources, in order to determine or identify the grid event and select a script with commands to execute. The script of this technical solution can establish a remote access connection with a client computing device of the building, then launch the user interface of the BMS previously configured for the building, and then perform a sequence of actions to control the BMS via the user interface. By remotely accessing the user interface of the BMS to control the BMS, this technical solution can reduce the complexity and amount of time needed to establish automatic load reduction at a building in response to a grid event, thereby increasing energy efficiency and reducing energy consumption of a building.

An aspect of this technical solution can be directed to a system to respond to electric events. The system can include a data processing system having memory and one or more processors. The data processing system can determine, based on an event, to modify an electrical load of a site. The electrical load can be managed by a building management system separate from the data processing system. The data processing system can select, responsive to the determination to modify the electrical load, one or more parameters for the site to adjust to modify the electrical load. The data processing system can identify, based on the one or more parameters, a script constructed from previously processed interactions between a human-machine interface of the building management system to adjust the one or more parameters for the site. The data processing system can establish, via a network, a communication session with a remote access agent executed by a computing device of the site to invoke the building management system of the site. The data processing system can generate a sequence of commands defined by the script that adjust the one or more parameters for the site to modify the electrical load of the site. The data processing system can transmit, via the communication session to the remote access agent executed by the computing device of the site, the sequence of commands. The sequence of commands can cause the remote access agent to execute the sequence of commands on the human-machine interface of the building management system to modify the electrical load of the site.

An aspect of this technical solution can be directed to a method of responding to electric events. The method can be performed by a data processing system having memory and one or more processors. The method can include the data processing system determining, based on an event, to modify an electrical load of a site. The electrical load of the site can be managed by a building management system separate from the data processing system. The method can include the data processing system selecting, responsive to the determination to modify the electrical load, one or more parameters for the site to adjust to modify the electrical load. The method can include the data processing system identifying, based on the one or more parameters, a script constructed from previously processed interactions between a human-machine interface of the building management system to adjust the one or more parameters for the site. The method can include the data processing system establishing, via a network, a communication session with a remote access agent executed by a computing device of the site to invoke the building management system of the site. The method can include the data processing system generating a sequence of commands defined by the script that adjust the one or more parameters for the site to modify the electrical load of the site. The method can include the data processing system transmitting, via the communication session to the remote access agent executed by the computing device of the site. The sequence of commands can cause the remote access agent to execute the sequence of commands on the human-machine interface of the building management system to modify the electrical load of the site.

An aspect of this technical solution can be directed to a system to respond to electric events. The system can include a data processing system having memory and one or more processors. The data processing system can receive a site identifier for a site managed by a building management system separate from the data processing system. The site can include a computing device used to control the building management system via a human-machine interface of the building management system. The data processing system can identify a plurality of sensors installed at the site. The plurality of sensors can transmit data to the data processing system. The data processing system can determine, based on a configuration of the building management system and the plurality of sensors installed at the site, a plurality of events for the site. The data processing system can detect, responsive to a first event in the plurality of events, a sequence of interactions to control one or more parameters of the building management system via the human-machine interface. The data processing system can configure a script based on the sequence of interactions. The script can i) establish a communication session with the computing device, ii) invoke the building management system, and iii) execute the sequence of interactions via the human-machine interface of the building management system. The data processing system can generate, based on the first event, a trigger for the script to cause execution of the script responsive to the first event.

An aspect of this technical solution is directed to a method of responding to electric events. The method can be performed by a data processing system having memory and one or more processors. The method can include the data processing system receiving a site identifier for a site managed by a building management system separate from the data processing system. The site can include a computing device used to control the building management system via a human-machine interface of the building management system. The method can include the data processing system identifying a plurality of sensors installed at the site. The plurality of sensors can transmit data to the data processing system. The method can include the data processing system determining, based on a configuration of the building management system and the plurality of sensors installed at the site, a plurality of events for the site. The method can include the data processing system detecting, responsive to a first event in the plurality of events, a sequence of interactions to control one or more parameters of the building management system via the human-machine interface. The method can include the data processing system configuring a script based on the sequence of interactions. The script can i) establish a communication session with the computing device, ii) invoke the building management system, and iii) execute the sequence of interactions via the human-machine interface of the building management system. The method can include the data processing system generating, based on the first event, a trigger for the script to cause execution of the script responsive to the first event.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
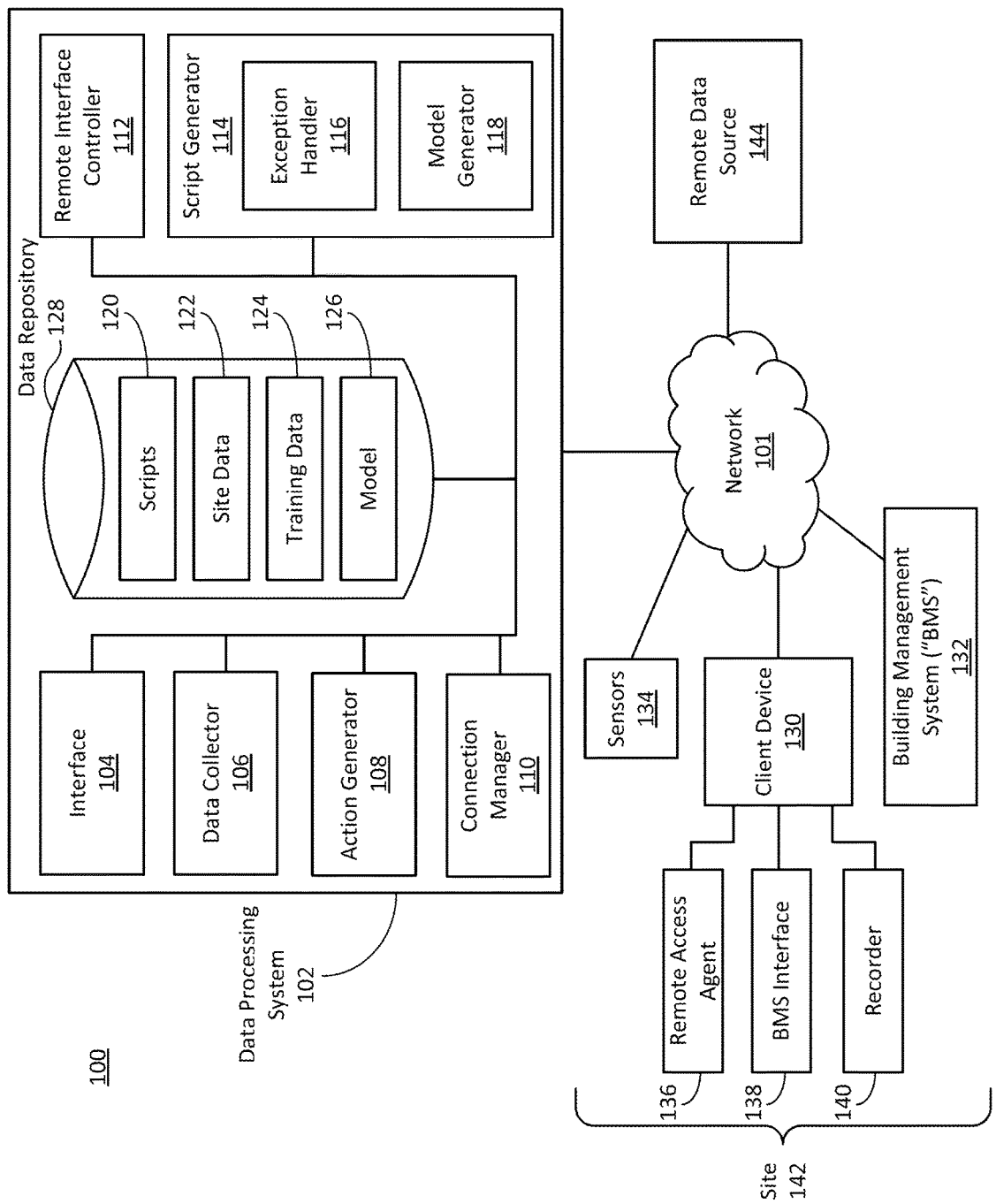
FIG. 1 is an illustration of an example system to respond to grid events, in accordance with an implementation.

Following below are more detailed descriptions of various concepts related to, and implementations of, methods, apparatuses, and systems of responding to grid events. The various concepts introduced above and discussed in greater detail below may be implemented in any of numerous ways.

Systems and methods of this technical solution are generally directed to responding to grid events by reducing a load at a building using robotic process automation. There can be many scenarios in which an operator of a site, such as a commercial or residential building or structure, may want to modify the load of a building to modify or reduce energy demand during moments of peak demand or to provide grid services. The load can refer to the consumption of a utility provided via a utility distribution grid, such as electricity provided via an electricity distribution grid. Further, sites can respond to grid events by modifying the load of the site. There can be various instances in which it may be beneficial for a site to modify its load. For example, a building can respond to a grid event by reducing energy use for a set period of time due to either a demand response event (e.g., a change in the power consumption of the site to better match the demand for power with the supply of power) on the grid, or to avoid high demand charges arising from an increase in energy demand on the grid relative to energy supply. For example, automating a fresh air intake of a building can be based on matching the outside temperature with a servo motor to open a vent a particular amount.

However, it can be challenging for a building to modify its load in an efficient and effective manner in response to a grid event or other event without negatively impacting an environment of the site (e.g., heating or cooling or other machinery on the site). For example, manually changing a temperature set point, fan speed or other parameter directly into a BMS can be tedious, cumbersome, error prone, or introduce excessive delay, thereby preventing the site from realizing the desired energy savings in a timely manner. It can also be tedious, cumbersome, and error prone to generate a single command that automates a sequence of commands in the BMS to automatically modify or reduce the load. For example, it may take 6 months to implement a system that takes a single command and generates a sequence of commands to input into a BMS to reduce load, which can result in a loss of energy reductions for 6 months in which the system is not yet in place. Further, any changes to the site can introduce several more months to update the sequence of commands to modify or reduce load. This can be because hundreds or thousands of data points and parameters may be mapped via an application programming interface ("API"), which can be particularly challenging with older BMSs that have rudimentary APIs, proprietary APIs, or in many cases no API whatsoever. Thus, it may be challenging to efficiently scale up load reduction processes for a particular site or multiple sites as the number of elements to control increase or the number of events increase.

Sites or buildings can respond to grid events using a demand response program. A demand response program can be based on a utility notifying the site of when the grid event is to occur, so that the site can modify its load. Sites or building can respond to grid events corresponding to periods of high energy prices, demand charges (e.g., extra fees applied to electric bills based upon the highest amount of power drawn during any time interval, such as 15 minutes, during a billing period) assessed by the utility provider for the site, or based on greenhouse gas optimization for when polluting power plants (e.g., natural gas peaking power plants) are brought online when there is high demand on the grid. However, there can be different types of grid events where the utility provider may not provide any notice, including, for example, coincident peak events, or other periods of abnormally high energy demand. In these scenarios, it may be possible to forecast or predict occurrences of grid events or higher energy demand relative to supply. When there is higher energy demand relative to supply, the efficiency of the utility or electric distribution grid may be reduced, or the price per unit of energy may increase. For grids that provide a dynamic pricing model that incentives sites to modify energy consumption based on energy supply, sites can dynamically modify their energy demand or participate in a whole sale energy market to facilitate efficiencies on the grid. Thus, to participate in a whole sale energy market or otherwise improve grid energy distribution efficiencies, a site can quickly modify its load to reduce load during grid events without sacrificing tenant comfort.

Systems and methods of this technical solution are generally directed to responding to grid events by reducing a load at a building using robotic process automation ("RPA"). Using RPA can simplify the process of automating BMS to respond to grid events. RPA can refer to or include a software "robot" application that can replicate human-computer interactions. This technical solution, using RPA, can mimic actions taken by the human operators of the BMS, such as button clicks on a human-machine interface, to respond to grid events in real-time (e.g., within 1 second, 2 seconds, 5 seconds, 10 seconds, 1 minute, 5 minutes, 10 minutes or other time interval of receiving an indication of an occurrence of a grid event). The technical solution can automate sequences of actions within a BMS to perform repeatable tasks that may not use operator judgement and have known constraints and conditions that affect the site.

For example, the site can receive a signal from a utility or other third-party indicating when to enact a sequence in the BMS. The site can receive the signal at a specified time prior to a demand response event from the utility or an aggregator. The site can implement the sequence of commands at a corresponding time, putting into action a series of measures configured to reduce the load within the building.

In implementations, this technical solution can be integrated with machine learning forecasting to predict a grid event or other opportunity to modify a load of the site. Based on this forecast, the technical solution an generate or trigger a command based on a predicted grid event (e.g., a coincident peak event) to modify the load of the building using the sequence of actions generated via RPA. In another configuration of the invention the RPA process can be integrated with machine learning forecasting for greater automation.

The systems and methods of this technical solution can modify or reduce a load at a site while maintaining the performance at the site, such as tenant comfort, by adding conditional actions. For example, if a space at the site is to be maintained between a lower and upper bound temperature threshold and there is an instruction to reduce load during a specific time period, the system can pre-cool (or pre-heat) the space, subject to the conditions that temperature sensors throughout the building stay within the predetermined bounds. Similarly, during the load reduction period the temperature setpoints can be raised (or lowered) subject to the condition that the setpoints stay within a desired temperature range.

To do so, this technical solution can identify a configuration of a site, including the types of electrical and mechanical equipment at the site, what sensors are deployed for the site, what third-party data is available for the site, and constraints for the site. Third-party data can include, for example, whether information, demand response notifications, sunlight conditions, etc. Constraints can include minimum or maximum temperature settings for a space, for example, and can be customized for the site. The technical solution can then determine or identify types of events responsive to which a sequence of commands can be initiated to modify load of the site. For example, if the site includes a space with an occupancy sensor, then a type of event and sequence of actions can include: if the occupancy is less than five people in the space, then decrease the airflow for that space by lowering a damper to a particular level. The technical solution can then record (e.g., using a macro recorder) the operator using the BMS via the graphical user interface ("GUI") of the BMS to lower the damper to the desired level in response to the event (e.g., detecting occupancy for the space is less than 5 people). The system can record the operating performing the sequence of actions for each type of event at the site.

The technical solution can process the recordings to generate a script with a sequence of commands or actions. The technical solution can integrate exception handling into the sequence of actions to improve reliability. For example, when an operator interacts with the GUI of the BMS, an unrelated prompt or window can be rendered in the foreground, obfuscating the GUI of the BMS while a sequence of actions are being executed. This can result in an incorrect or incomplete interaction with the BMS, which can cause the BMS to not adjust the load or inadvertently increase the load of the building. However, this technical solution can be configured to detect the unrelated prompt by performing a screen capture on the client device rendering the GUI of the BMS, and comparing the state of the screen with a desired state using, for example, image recognition, prior to executing an interaction with the BMS, thereby performing exception handling and mitigating or preventing erroneous operation of the BMS. The script can be configured to handle various types of exceptions in order to create a robust and reliable script.

The technical solution can validate the script by determining whether the script achieves the desired objective, such as reducing the load of the site. The system can measure the load, energy use, or other parameters (e.g., heating, cooling, or ventilation) of the building prior to executing the script, and compare the load or energy consumption of the building subsequent to execution of the script to validate whether the script achieves the desired objective while satisfying the constraints or conditions (e.g., within minimum and maximum temperature setpoints). For example, the system can confirm whether the power consumption of the site is less when the damper has been reduced by a certain percentage while maintaining the desired airflow or temperature of a particular space. If the script is validated, then the system can activate the script for the corresponding event. However, if the script does not reduce power consumption or satisfy the desired constraints such as temperature or airflow for the space, the system can determine not to activate the script.

Once the script has been generated, validated and activated, the system can execute the script responsive to a grid event or other trigger, condition, forecast, or instruction. To do so, the system can detect the event and then select the script responsive to the event. The system can remotely access a client device at the site using a remote access agent. The system can launch the BMS to bring the GUI of the BMS to the foreground. The system can execute the script to perform the sequence of interactions with the GUI of the BMS. The system can then terminate the connection upon completion of the script.

FIG. 1 illustrates an example system 100 to respond to grid events. The system 100 can include a data processing system 102. The data processing system 102 can communicate with one or more sensors 134, client devices 130, building management systems ("BMS") 132, or remote data sources 144 via a network 101. The network 101 can include computer networks such as the Internet, local, wide, metro, or other area networks, intranets, satellite networks, and other communication networks such as voice or data mobile telephone networks. The network 101 can be used to access information resources such as web pages, web sites, streaming resources, data feeds, domain names, or uniform resource locators that can be used to facilitate responding to grid events.

The network 101 can be used by the data processing system 102 to communicate, interface with, or receive information from one or more sensors 134, client devices 130, BMS 132, or remote data sources 144. For example, the data processing system 102 can establish a communication session with the client device 130 to control the client device 130. In another example, the data processing system 102 can receive data, measurements, or other information from sensors 134 via the network 101. In yet another example, the data processing system 102 can receive data from the remote data source 144 such as weather information, solar intensity information, or demand response information.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having one or more processors to communicate via the network 101, for example with the sensors 134, client device 130, BMS 132, or remote data source 144. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, cloud computing environment, cloud server, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one remote data source 144. The remote data source 144 can be maintained, administered or otherwise managed by a third-party entity that is different from the entity that maintains, administers or otherwise manages the data processing system 102. The remote data source 144 can be maintained, administered or otherwise managed by a third-party entity that is different from the entity that maintains, administers or otherwise manages the client device 130. The remote data source 144 can be maintained, administered or otherwise managed by a third-party entity that is different from the entity that maintains, administers or otherwise manages the BMS 132. An entity can refer to company, organization, or individual. A third-party entity can refer to an entity that is different from the entity that administers the data processing system 102.

The remote data source 144 can include, for example, a utility provider entity. A utility can be electricity, and the utility provider can be an electric power company or entity that generates or distributes electricity to customer sites 142. A customer site 142 can refer to or include one or more buildings, campuses, lots, studios, complexes, warehouses, or other man-made structures that consume the utility. For example, the customer site 142 can include commercial or residential buildings, such as an office building or an apartment building. The site 142 can be located at a geographic area and have an address, location, latitude and longitude. The site 142 can be associated with a unique identifier, such as a building identifier (e.g., an alphanumeric identifier). The site 142 can receive the utility via a utility distribution grid, such as an electricity distribution grid, from the utility provider. The remote data source 144 (e.g., utility provider) can provide information about the utility, such as an indication of supply versus demand, price per unit of energy, price per unit of energy during a time interval, demand response events, or other information that the data processing system 102 can use to identify a grid event and trigger a response to the grid event.

Remote data source 144 can include, for example, a weather information provider. The weather information provider can provide weather information for the geographic location at which the site 142 is located. Weather information can include the current or forecasted weather, temperature, winds, precipitation, or sun intensity.

The remote data source 144 can include a utility aggregator entity, such as an electric aggregator entity. The electric aggregator can gather consumer sites 142 for the purpose of establishing a rate for the generation of the electricity service form an electric supplier. The data processing system 102 can receive rate information from the electric aggregator via network 101, such as price per kilowatt hour ("kWh").

The system 100 can include or interface with one or more sensors 134. The sensors 134 can be located at or throughout the site 142. The sensors 134 can be located at one or more spaces, regions, or locations within a site 142, such as different rooms within a building. Each sensors 134 can be assigned or associated with a unique identifier that can indicate the type of sensors, site 142 information, or location or region in which the sensor 134 is located.

The sensors 134 can be of any type and be designed, constructed or operational to measure, detect or otherwise provide information to the data processing system 102 that facilitates identifying or responding to grid events. Sensors 134 can include, for example, temperature sensors, ambient temperature sensors, occupancy sensors (e.g., whether room is occupied by people or the number of people in a room), proximity sensors, humidity sensors, air quality sensors, carbon dioxide sensors, carbon monoxide sensors, or ambient light sensors. The site 142 can include sensors 134 that can detect, sense or otherwise information associated with the BMS 132. For example, the sensors 134 can determine damper levels, actuator levels, fan speed, heating element level, cooling element level, window open or closed, shades open or closed, or whether the lights on or off.

The sensor 134 can include an electric meter for the site 142. The electric meter sensor can measure, determine, or otherwise identify the amount of electricity consumed by the site 142. The amount of electricity consumed by the site 142 can be referred to as the total electric load of the site 142. The electric meter can measure the electric load with units of kilowatts. The electric meter can further indicate electricity consumption over a period of time in kilowatt hours. The site 142 can include an electric meter provided by the utility provider, in which case the data processing system 102 can receive the electric load information from the electric meter provided by the utility provider. In some cases, the site 142 can include an additional or different electric meter sensor 134 configured to transmit real-time electric load information to the data processing system 102.

The system 100 can include, interface with or otherwise access a building management system ("BMS") 132. The BMS 132 can manage, control, or monitor electrical or mechanical elements or components within a site 142. The BMS 132 can include or refer to building automation system. The BMS 132 can be a computer-based control system installed at the site 142 that controls and monitors the site's mechanical and electrical equipment such as ventilation, lighting, power systems, fire systems, and security systems. The BMS 132 can be configured in any manner and use any proprietary or non-propietary protocol, including, for example, C-Bus or Profibus. The BMS 132 can integrate the use of Internet protocols and open standards such as DeviceNet, SOAP, XML, BACnet, LonWorks, Modbus or KNX.

The BMS 132 can be associated with a large percentage of the sites 142 energy use. For example, the BMS 132 can be responsible or represent 30%, 40%, 50%, 60%, 70% or more of the energy used at a site 142. For example, the BMS 132 can control or monitor heating, cooling, ventilation, lighting, security systems, fire systems, elevator systems, or access control (e.g., turnstiles or doors) of a site 142.

While the BMS 132 can be configured to control electrical or mechanical equipment at the site 142, the BMS 132 may or may not be located at the site 142 itself. In implementations, the BMS 132 can be located on the site 142, such as on one or more servers, computing devices, or processors located at the site 142. In implementations, the BMS 132 can execute on a server or cloud remote from the site 142, such as at a data center in a central location. For example, the BMS 132 can be a software-as-a-service executing on a cloud or one or more servers and configured to manage, control, or otherwise monitor electrical and mechanical equipment at the site 142. The BMS 132 can provide an interface, application programming interface ("API"), user interface ("UI"), or graphical user interface ("GUI") through which a user can interact with the BMS 132 to manage, control, or otherwise monitor electrical and mechanical equipment at the site 142.

The client device 130 (or client computing device or computing device) can be used to access, control, interface or otherwise interact with the BMS 132. An operator, site manager, or other user can use the client device 130. The client device 130 can include a desktop computer, laptop computer, tablet computer, smart phone, mobile telecommunication device, or portable computer. The client device 130 can include one or more component depicted in FIG. 7. The client device 130 can launch, invoke, instantiate, or otherwise access a BMS interface 138, such as the UI or GUI of the BMS 132. For example, the client device 130 can include a display device, keyboard, mouse, touch input or other input/output devices controllable or accessible by a user to access the BMS 132.

The client device 130 can be located at the site 142. In some cases, the client device 130 may not be located at the site 142. For example, the client device 130 can be located remote from the site 142, but be configured to access the BMS 132 via network 101 to manage, control, or monitor electrical or mechanical equipment at the site 142.

The client device 130 can include a remote access agent 136 designed, constructed and operational to interface or communicate with the data processing system 102. The remote access agent 136 can include a daemon or background task that executes on the client device 130 in order to facilitate remote access control of the client device 130. The remote access agent 136 can be launched on startup of the client device 130 or otherwise launched or invoked on the client device 130 so as to detect or receive requests, instructions or commands from the data processing system 102. The remote access agent 136 can interface with the connection manager 110 of the data processing system 102. The remote access agent 136 can receive commands or instructions from the data processing system 102 to perform one or more actions. The actions can include interacting with the BMS 132 via the BMS interface 138. For example, the action can be to launch the BMS interface 138 and interact with the BMS interface 138 to control a parameter or operation of the BMS 132 via the BMS interface 138.

The client device 130 can include a recorder 140 designed, constructed and operational to identify, detect, or record a sequence of interactions between the user of the client device 130 and the BMS interface 138 or other components of the client device 130 via one or more input devices (e.g., input device 730) of the client device 130 (e.g., keyboard, mouse, touch interface, gestures, voice input, etc.). The recorder 140 can include a standalone macro recorder. The recorder 140 can include software that can record macros. The recorder 140 can detect user input into input device of the client device 130 and record the type of input, sequence of the input, time stamp of the input or other information associated with the input.

The recorder 140 can detect, record, or otherwise identify output by the client device 130. The recorder 140 can record visual output rendered by the client device 130 on a display device (e.g., display 735) of the client device 130. The visual output can include the BMS interface 138, such as a graphical user interface of the BMS 132. The recorder 140 can take screenshots or snapshots of what is rendered for display by the client device 130. The recorder 140 can assign timestamps to the screenshots. The recorder 140 can take screenshots corresponding to the user input. For example, the recorder 140 can take a screenshot responsive to user input via an input device of the client device 130 in order to correlate the input with what is displayed on the screen. By taking screenshots responsive to user input as opposed to continuously recording what is rendered on the screen, the recorder 140 of this technical solution can reduce data storage, memory utilization, network bandwidth or processor utilization when generating a script to respond to grid events.

The system 100 can include at least on data processing system 102. The data processing system 102 can include, interface, or otherwise communicate with at least one interface 104. The data processing system 102 can include, interface, or otherwise communicate with at least one data collector 106 (or data collector component). The data processing system 102 can include, interface, or otherwise communicate with at least one action generator 108 (or action generator component). The data processing system 102 can include, interface, or otherwise communicate with at least one connection manager 110 (or connection manager component). The data processing system 102 can include, interface, or otherwise communicate with at least one remote interface controller 112 (or remote interface controller component). The data processing system 102 can include, interface, or otherwise communicate with at least one script generator 114 (or script generator component). The script generator 114 can include, interface or otherwise communicate with at least one exception handler 116 (or exception handler component 116). The data processing system 102 can include, interface or otherwise communicate with at least one data repository 128 (or database, or storage device).

The interface 104, data collector 106, action generator 108, connection manager 110, remote interface controller 112, script generator 114, exception handler 116, and model generator 118 can each include at least one processing unit or other logic device such as programmable logic array engine, or module configured to communicate with the database repository 128 or database. The interface 104, data collector 106, action generator 108, connection manager 110, remote interface controller 112, script generator 114, exception handler 116, and model generator 118 can be separate components, a single component, or part of the data processing system 102. The system 100 and its components, such as a data processing system 102, can include hardware elements, such as one or more processors, logic devices, or circuits.

The data repository 128 can include one or more local or distributed databases, and can include a database management system. The data repository 128 can include computer data storage or memory and can store, maintain, or manage one or more of scripts 120, site data 122, training data 124 (or training data 124), site data 122, training data 124, or a model 126, among other information that can facilitate connecting client devices with expert client devices.

The script 120 can refer to or include a sequence of actions that can be used to control the BMS 132 via the BMS interface 138 accessed by client device 130. For example, the script 120 can include a sequence of actions to launch the BMS interface 138, access a state or window of the BMS interface 138, adjust a parameter of the BMS 132 via the BMS interface 138, and then close the BMS interface 138.

The site data 122 can include information about the site 142 that facilitates identifying a grid event or responding to a grid event by adjusting the amount of load utilized by the site 142. The site data 122 can include, for example, one or more of: a unique site identifier, site location (e.g., building address, latitude or longitude coordinates, zip code, geopolitical boundary or region), utility provider information (e.g., an identifier of the electricity provider for the site), historical consumption information associated with the site (e.g., amount of electricity used over the past 24 hours, 48 hours, 7 days, 30 days, 2 months, 3 months, 6 months, 1 year, 2 years, etc.), information associated with the sensors 134 located at the site 142, authentication credentials used to access the client device 130 of BMS interface 138 or BMS 132, layout of the site 142 (e.g., number of rooms, size of rooms, layout of building, etc.), historical weather or climate information associated with the site 142, or other information about the site 142 that can facilitate identifying or responding to grid events.

The training data 124 can include information used by a model generator 118 to train the model 126, such as a machine learning model 126. The training data 124 can include or be based on site data 122 for one or more sites 142. The training data 124 can include historic site data, energy consumption information, weather information, responses to grid events, performance information (e.g., amount of energy reduction responsive to execution of a script to control the BMS 132 responsive to a grid event), information about sensors 134, etc. The model 126 can include or refer to a machine learning model training using a machine learning or statistical technique, such as regression analysis, neural network, convolution neural network, decision tree, support-vector machine, or Bayesian network. The model 126 can be customized for a site 142, or a category of sites 142, or apply to different types of sites 142.

The data processing system 102 can include an interface 104 (or interface component) designed, configured, constructed, or operational to communicate with a client device 130, sensors 134, BMS 132, and a remote data source 144 via network 101. The interface 104 can receive and transmit information using one or more protocols, such as a network protocol. The interface 104 can include a hardware interface, software interface, wired interface, or wireless interface. The interface 104 can facilitate communication between one or more components of the data processing system 102.

The interface 104 can include or provide a user interface, such as a graphical user interface or frontend user interface. The interface 104 can provide the user interface or access to a frontend interface via client device 130 or other computing device. The interface 104 can receive data from a client device 130, such as data files generated by recorder 140. The interface 104 can provide output for presentation via, or control of, the client device 130.

The data processing system 102 can include a script generator 114 designed, constructed and operational to generate, construct, or otherwise a script that can execute a sequence of actions at a site 142 to control a BMS 132 of the site 142. To do so, the script generator 114 can first receive a site identifier associated with the site 142. The script generator 114 can generate, establish or configure one or more customized scripts for a particular site 142. The script generator 114 can receive the site identifier for site 142 via an interface of the client device 130, or an interface of the data processing system 102. The site identifier can include an alphanumeric identifier or location. The script generator 114, using the site identifier, can perform a lookup in site data 122 data structure to identify additional information associated with the site 142.

The site 142 can include a client device 130 that can provide a human-machine interface (e.g., BMS interface 138) for the BMS 132 that controls the site 142. The BMS interface 138 can be established or provided by the provider of the BMS 132. The BMS interface 138 can include a UI or GUI that is configured for a user or operator of the client device 130 of the site 142 to interact or control the BMS 132.

The script generator 114 can identify the sensors 134 installed at the site 142. The script generator 114 can receive information about the number of sensors 134 at the site 142, the types of sensors 134, location of the sensors 134, identifiers associated with the sensors 134, or any other information about the sensors 134 that facilitates generating a script or detecting grid events for the site 142. The script generator 114 can receive communication information associated with the sensors 134 in order to communicate or interface with the sensors 134. For example, the script generator 114 can receive in internet protocol ("IP") address for the sensors in order to transmit or receive data packets with the sensors 134. The data packets transmitted from the data processing system 102 to the sensors 134 can include a request or query for sensor information. The data packets transmitted from the sensors 134 to the data processing system 102 can include sensors information, readings, measurements, or status information, for example. The sensors 134 can be configured with an IP address of the data processing system 102 or other communication information to transmit data packets to the data processing system 102 containing sensor information.

The script generator 114 can generate a prompt for a user or operator of the site 142 to input or enter information about the sensors 134. Types of sensors 134 can include, for example, occupancy sensor, temperature sensor, humidity sensor, actuator sensor, or fan speed sensor. The script generator 114 can generate a prompt for a user or operator of the site 142 to input or enter information about a configuration of the site 142. The configuration of the site 142 can include, for example, the type of building, size of the building, layout of the building, rooms in the building, or any other site data 122 that facilitates identifying grid events or responding to grid events for the site 142. In implementations, the script generator 114 can obtain the configuration information from the site data 122.

The configuration can indicate information about utility consumption at the site 142. The configuration can indicate the number or types of components that use power, such as electricity, at the site 142. For example, the configuration can include heating information, ventilation information, cooling information, fan speed information, or damper information. The heating information can indicate the type of heating system that is at the site 142, the size of the heating system, the amount of power consumed by the heating system, or other information. For example, the type of heating system can be radiant heat, forced hot air, gas heat, oil heat, or electric heat. The type of cooling system can be air conditioning that uses electricity. Ventilation information can include the number of dampers, fans or actuators and their actuation or variability. The configuration can include information about the number of heating or cooling zones at the site 142. The configuration can include information about occupancy levels at different regions or zones in the building. Thus, the data processing system 102 can use the configuration information and the sensor information to determine how to modify or reduce load at the site 142.

Based on the configuration and sensor information, the script generator 114 can identify one or more load modification measures for the site 142. Load reduction measures can refer to how the electrical load of the site can be modified. The electrical load of the site 142 can be modified by adjusting a parameter of the BMS 132 managing the site 142. To modify the electrical load, one or more actions can be performed on the BMS interface 138 to adjust the parameter of the BMS 132. Identifying load modification measures for the site 142 can include identifying an event that can trigger one or more actions to adjust a parameter of the BMS 132 to result in the desired modification of the site.

The event can refer to a trigger or condition that responsive to which the data processing system 102 determines to modify a load of the site. For example, types of event can include an occupancy-based trigger, demand response event, pre-heating event, pre-cooling event, coincident peak events, abnormally high energy demand events, increased price event, or a decreased price event. The events can include, correspond to, or be triggered responsive to periods of high energy prices, demand charges assessed by the utility provider for the site, or based on greenhouse gas optimization for when polluting power plants (e.g., natural gas peaking power plants) are brought online when there is high demand on the grid. The events can be to reduce the amount of energy by the site 142 during a given time interval, or to reduce overall energy consumption. One or more types of events can be detected or identified in real-time. One or more types of events can be predicted or forecasted using a model 126.

The data processing system 102 can determine the events based on the remote data sources 144 that are available or accessible to the data processing system 102 via network 101. For example, a remote data source 144 can indicate (e.g., via an electronic notification or message) that a peaking power plants has been brought online to generate and supply power on the electric distribution grid from which the site 142 receives electricity. In another example, the remote data source 144 can indicate a period of high energy prices, or demand charges. The data processing system 102 can determine the events based on the types of remote data sources 144 or types of information provided by the remote data sources 144 for the site 142. For example, if a type of information is weather information for the site 142, then the data processing system 102 can use the weather information to generate an event. If a remote data source 144 can provide the sun level or solar intensity at the site 142 at a particular time of day or moment, then the data processing system 102 can identify a sun-based event (e.g., if the solar intensity is determined or predicted to be high, then open or close window shades at the site to increase or decrease the temperature without using heating or cooling elements at the site 142.

The script generator 114 can include a model generator 118 designed, constructed and operational to train a model 126 using training data 124 (or training data). The model generator 118 can train the model 126 using training data or training data 124 to identify or predict events, such as demand response events or price per kwh rate increases based on various data points (e.g., from remote data sources 144), such as season of the year, time of day, day of the week, date, weather conditions, temperature, occupancy in building, meetings booked, traffic patterns, or current demand or power usage. The model 126 can be trained to predict the occurrence of an event and generate a trigger to cause selection and execution of a corresponding script to modify load of the site 142.

The model generator 118 can generate or train the model 126 using a machine learning technique. The model generator 118 can use any type of machine learning technique, including, for example, supervised learning, unsupervised learning, or reinforcement learning. The model generator 118 can use functions such as linear regression, logistic regression, a decision tree, support vector machine, Naïve Bayes, k-nearest neighbor, k-means, random forest, dimensionality reduction function, or gradient boosting functions.

The model generator 118 can use a training data set to train the model. The training data set can include site data 122 associated with one or more sites 142, constraints, events, loads. The model 126 can be training to identify events for which load can be modified or reduced based on given set of constraints for a site 142, or given set of sensors available for a site 142. The training data can classify site data and constraints with events that can result in a desired load modification for the site 142.

The data processing system 102 can use the model 126 to determine what adjustment to make to a parameter of the site 142 or BMS 132 in order to modify the load of the site. For example, the model 126 can be trained with training data that can indicate how certain adjustments to parameters impacts the load of the site 142. Thus, the data processing system 102 can use the model 126 to identify or detect an adjustment to a parameter for the site 142 responsive to a grid event. The data processing system 102 can determine, via the model 126, an adjustment to the one or more parameters responsive to an event based on the constraints for the site, the sensors for the site, and historical electrical load for the site. Based on the adjustment to the parameter output by the model 126, the data processing system 102 can configure a script with a sequence of actions that modify or reduce electrical load for the site responsive to the trigger event.

Thus, the data processing system 102 can identify one or more events to cause load modification measures for the site 142 based on the sensor 134 information (e.g., the types of sensors 134 that are available at the site to provide sensor information) and the configuration information for the site 142 (e.g., the types of electrical or mechanical equipment that can be controlled at the site 142 in order to reduce energy consumption).

The data processing system 102 can identify how an operator of the BMS 132 at the site 142 interacts with the BMS interface 138 to control the BMS 132 in response to the event. The data processing system 102 (e.g., via script generator 114 or remote interface controller 112) can detect a sequence of interactions that control one or more parameters of the BMS 132 via the human-machine interface (e.g., BMS interface 138). In some cases, the data processing system 102 can establish a remote access session with the client device 130, and the remote interface controller 112 can receive (e.g., via the remote access agent 136 or the recorder 140) indications of the user input into the BMS interface 138 and mirror or simulate those interactions in a manner that allows the script generator 114 to generate a sequence of commands corresponding to the simulated user input.

The script generator 114 can receive a data file or data feed from the remote interface controller 112 or the recorder 140 that records the interactions between input devices of the client device 130 and the BMS interface 138, as well as screenshots of screen grabs of a display device of the client device 130. The screenshots or screen grabs can be for the a particular window having the BMS interface 138 that is rendered by the client device 130, or the entire desktop being presented via the client device 130.

For example, the user can access the BMS 132 via a client application, such as a web browser or a dedicated, native BMS client application. The client device 130 can also execute other applications simultaneously while executing the application that provides the BMS interface 138. The recorder 140 (e.g., a macro recorder) can obtain screenshots with one or more applications execute presented or rendered on the client device 130.

The script generator 114 can receive the recording from the client device 130 and the corresponding screenshots. The script generator 114 can parse the recording and the screenshots to identify or determine what parameters were controlled by the user. Parameters can include, for example, one or more of adjusting a temperature setpoint, changing fan speed, changing a damper, changing a lighting configuration, or any other parameter or function controlled by the BMS 132.

The script generator 114 can generate a script that can replay the detected sequence of actions. For example, the script generator 114 can generate a script using JavaScript, Python, Jython or other libraries to automate GUI interaction using image patterns to direct keyboard or mouse interactions. A script library can include a portion configured to deliver keyboard and mouse events to appropriate locations on a GUI, and an engine (e.g., a C++ engine) that searches given image patterns on the screen. The script generator 114 can configure a script to replay the detected sequence of interactions into the BMS interface.

For example, the generated script can indicate a location on the GUI of the BMS interface 138 at which to provide a mouse input (e.g., single or double right or left mouse click). The script can indicate a location on the GUI of the BMS interface 138 at which to provide a keyboard input (e.g., alphanumeric input, lowercase, uppercase, or symbols). The generated script can determine the location at which to enter the keyboard or mouse input using the image patterns generated from the recorded screenshots. The script can be configured to determine the location by comparing a current screenshot of the BMS interface 138 or current state of the foreground applications presented on the client device 130, and comparing that current state with a predetermined state based on recorded screenshots. Based on the comparison, the script can identify a location (e.g., a pixel row and column) at which to enter keyboard or mouse input.

In implementations, the script generator 114 can configure the script to establish a communication session with the client device 130. The script generator 114 can configure the script to invoke the BMS 132 or BMS interface 138. The script generator 114 can configure the script to execute the sequence of interactions via the human-machine interface of the building management system. To establish the communication session with the client device 130, the script generator 114 can conjure the script with site data 122, such as a site identifier, site IP address, authentication credentials, login credentials, etc. The script can use the site data 122 or access credentials to establish a communication session with the client device 130, such as via a remote access agent 136. The remote access agent 136 can be configured to authenticate and establish the communication session with the data processing system 102 and receive the script from the data processing system 102.

The script can include instructions to invoke, launch, or otherwise bring to the foreground the BMS interface 138. Such instructions can include invoking a terminal on the client device 130 and inputting a path and filename for the BMS interface 138, triggering a shortcut or command to launch the BMS interface 138, or selecting an icon for the BMS located on the desktop or in a menu or toolbar. The script can use an image pattern of the icon to determine the location of the icon. Upon launching or otherwise invoking the BMS interface 138, the script can execute the sequence of interactions with the BMS interface 138.

Since there may be other applications executing on the client device 130 that can interface with execution of the script to interact with the BMS interface 138, the script generator 114 can include an exception handler 116 designed, constructed and operational to integrate exception handling into the generated script. An exception can refer to an occurrence on the client device 130 that can prevent the script from properly executing the sequence of commands. For example, an exception can include a prompt or window from an application executing on the client device 130 that is different from the BMS interface 138 coming into the foreground or obfuscating a portion of the BMS interface 138 such that the script enters a keyboard or mouse input into the prompt of the different application as opposed to the BMS interface 138. This can result in the sequence of interactions partially or fully not being executing in the BMS interface 138, which can result in erroneous or incorrect control of the BMS 132. For example, rather than inputting the correct temperature setpoint, the script can enter the wrong temperature setpoint or not adjust the temperature setpoint, thereby either not modifying the load of the site, or incorrectly modifying the load of the site 142 (e.g., increasing power consumption when the intent of the script may have been to reduce load).

The exception handler 116 can detect exceptions using the screenshots or screengrabs obtained by the recorder 140. The exception handler 116 can identify an exception as a prompt from an electronic mail application executing on the client device 130, the operator or user of the client device 130 navigating to a different application, or web page in the web browser, launching an incorrect application, etc. Exceptions can include automatic software updates performed by an operating system of the client device 130, or an automatic software updated pushed by the BMS 132. Exceptions can include the BMS 132 not being available or accessible to the client device 130, which can be a result of an error on the server hosting the BMS 132, network connection issues (e.g., wireless router or issues related to the internet service provider), or program crashes on the client device 130. Exceptions can include the state of the BMS interface 138 not being as expected, such as a manual override at the site 142 (e.g., emergency fire situation where the fire department disables the BMS 132 for the site using a manual control or switch).

To identify an exception, the exception handler 116 can be configured with predetermined images or patterns that correspond to the desired screen or image at which point a keyboard or mouse input is to be entered. The exception handler 116 can use image recognition to compare the current state with a predetermined state to detect a difference or exception. For example, if the current state includes an e-mail message notification overlapping with an input text field on the BMS interface 138 in which a new temperature setpoint is to be input by the script, then the exception handler 116 can be configured to either inject a pause or delay to wait for the prompt to disappear, or inject a second sequence of actions to close the notification or select the BMS interface 138 in order to bring the BMS interface 138 to the foreground. Thus, the script generator 114 can update the script to address the exception by removing the exception, thereby improving the reliability and accuracy of the script without causing erroneous operation of the BMS 132 for the site 142.

The exceptions can be identified and addressed by the exception handler 116 based on the data files recorded by the recorder 140 that includes the interactions performed by the operator on the BMS interface 138. In some cases, the exception handler 116 can identify exceptions in the recorded interactions and prevent any interactions associated with the exceptions from being programed into the script. For example, if the operator navigated to a news website while the recorder 140 was recording the operator changing a temperature setpoint, the exception handler 116 can remove the interactions associated with navigating to the news web site based on the news website not matching a predetermined image pattern with the BMS interface 138. In some cases, the exception handler 116 can use that exception to generate an exception handling sequence of events to navigate back to the BMS interface 138.

The script generator 114 can generate the script to confirm the state of the BMS interface 138 is the desired state prior to entering keyboard or mouse input into the BMS interface 138. The script generator 114 can generate a status check or state check script that can access the BMS interface 138 to determine a current state of electrical and mechanical equipment controlled or monitored by the BMS 132, and compare the current state with a predetermined state or image pattern. The data processing system 102 can execute this status or state check script based on a predetermined interval, such as hourly, every half hour, every 15 minutes, every 10 minutes, or other time interval. In some cases, the script can be configured to run prior to executing a script to adjust a parameter of the BMS 132 so as to prevent erroneous adjustments.

The script generator 114 can associate the script with a trigger event. The trigger event can cause execution of the script. The data processing system 102 can execute the script in response to the trigger event. The data processing system 102 can execute the script in real-time, which can include or refer to launching the script within a time interval of detecting the trigger event. The time interval can be, for example, 1 second, 2 seconds, 5 seconds, 10 seconds, 30 seconds, 1 minute, 5 minutes, 10 minutes, or other time interval that is responsive to the grid event.

One or more script can be associated with one or more events. In some cases, a script can be customized for a particular event. In some cases, the script can be customized based on the event as well as other constraints associated with the site 14. The script can be customized based on state information associated with the BMS 132 at a current time. The state information can include or refer to the current state of the electrical and mechanical equipment located at the site 142 that is being managed, controlled, or monitored by the BMS 132. For example, the state information can include the current temperature setpoint for a zone of the site 142, current fan speed, current damper level, current humidity setting, etc.

The trigger event can include, for example, an indication from the utility provider or other remote data source 144 to reduce energy consumption for a time interval. The indication can be due to an increase in demand relative to supply of electric power, which can cause a price per kwh rate increase for the time interval or, of not controlled, can exceed the total available power supply of the utility provider and result in failure of the utility grid (e.g., brownouts, blackouts, or load shedding). Responsive to the trigger event, the data processing system 102 can select the corresponding script that can modify the load of the site 142.

The data processing system 102 can validate the script prior to activating the script. Validating the script can refer to or include determining that the script performs the desired function. For example, if the objective of the script is to modify the load the site 142 (e.g., either reduce or increase the load), then the data processing system 102 can confirm that the script, when executed, modifies the load of the site 142 accordingly. If the script does not modify the load of the site 142 as desired, then the data processing system 102 can determine to not activate the script. By preventing activation of scripts that do not realize the desired load modification for the site 142, the data processing system 102 can reduce unnecessary processing, network bandwidth, or memory resources by not storing and executing erroneous or invalid scripts. Further, by not activating scripts that may not function as desired, the data processing system 102 can prioritize other valid scripts that have the desired impact on the load of the site 142. For example, the data processing system 102 can prioritize scripts that modify the load of the site 142 for execution, thereby resulting in a more timely and reliable load modification.

In an illustrative example of script validation, the data processing system 102 can determine a first electrical load of the site 142 prior to a trigger event or test trigger event. If the test trigger event is a demand response event for which the load of the site is to be reduced, the data processing system 102 can select a script that can reduce the load. The data processing system 102 can determine current constraints of the site, such as temperature setpoint minimum and maximums, occupancy, and $CO_2$ maximum levels to select a script that can adjust a damper level in an attempt to reduce the load. A damper can be a valve or plate that stops or regulates the flow of air inside a duct, chimney or other air-handling equipment. Opening the damper can allow air flow to flow fully, whereas closing the damper can stop the flow of air. The script, in an attempt to reduce load, can close the damper from 18% to 16% in attempt to reduce energy usage by reducing the outside hot air from entering and reducing the amount of air conditioning. However, closing the damper by 2% may not have any noticeable or appreciable impact on the inside air temperature or reducing the amount of necessary air conditioning for a particular zone because other factors (e.g., amount of occupancy in the room) may play a more significant role. Or, closing the damper may have the inadvertent consequence of increasing the $CO_2$ levels in the zone of interest that has a higher occupancy at the moment, which can cause the fan speed to increase in order to circulate more air. Thus, the load of the site after executing the script may not have been reduced at all, or reduced beyond a threshold (e.g., 1% load reduction, 2% load reduction, 3% load reduction, or other percentage or amount), or may actually be increased, thereby invalidating the script. The data processing system 102 can determine to invalidate, or block activation or deactivate the script based on the script not having the desired load reduction.

In some cases, the data processing system 102 can adjust parameters of the script, such as the damper level, in an attempt to generate a script that has the desired load modification. If the script has the desired load modification, for example, reduces load of the site, then the data processing system 102 can validate and activate the script for a trigger event.

After the script has been generated and activated, the data processing system 102 can store the script in script data structure 120. The data processing system 102 can execute the script responsive to a trigger event. The data processing system 102 can collect data in order to detect a trigger event or grid event responsive to which to modify the load of a site.

The data processing system 102 can include a data collector 106 designed, constructed and operational to collect, receive, retrieve or otherwise identify or obtain data that facilitated identifying and responding to grid events. The data collector 106 can obtain data via network 101 in real-time, based on a time interval, or responsive to a request, condition, or event. The data collector 106 can receive data or information from sensors 134 located at the site 142, or one or more remote data sources 144. The data collector 106 can receive information about a grid event, such as a demand response event, a rate change for kwh (e.g., a price per kwh for a given time interval), or other information from a utility provider. The data collector 106 can receive weather information from a weather information service.

The data processing system 102 can include an action generator 108 designed, constructed and operational to process the data received by the data collector 106 and generate an action. The action can refer to or include a sequence of actions or commands defined by a script.

The action generator 108 can detect a grid event or other event based on the data received from the data collector 106. The action generator 108 can detect a grid event from a demand response program, which can include a utility notifying the site 142 of when and how to modify the load of the site 142. The action generator 108 can detect grid events based on periods of high energy prices, demand charges related to the utility provider and the site, or based on greenhouse gas optimization for when polluting power plants (e.g., natural gas peaking power plants) are brought online when there is high demand on the grid.

The action generator 108 can use sensor information, site data 122, training data 124, or the model 126 to detect the event. The event can be a trigger event, an indication, an instruction, a notification, or any other request or indicator to modify a load of the site 142. The indication of the event can be transmitted by the remote data source 144 (e.g., electric utility provider or aggregator), or the data processing system 102 can detect (e.g., predict or forecast) the event based on other information, such as weather conditions. The data processing system 102 can detect the event by monitoring a real-time price per kwh for the electric utility being delivered to the site 142 and identifying a change in the price per kwh for the electric utility. The change in the price can be an increase or a decrease. The data processing system 102 can trigger a grid event based on the price change for the electricity being greater than a threshold (e.g., an absolute value based on a local currency, or a percentage of the current price) or when the price exceeds or falls below a threshold.

The action generator 108 can determine, based on the detected event, to modify an electrical load of a site. The action generator 108 can select, responsive to the determination to modify the electrical load, one or more parameters for the site to adjust to have the desired modification to the electrical load of the site 142. The action generator 108 can identify one or more parameters of a BMS 132 to adjust that can modify the load of the site 142 in a desired manner, such as increasing or decreasing the load of the site. The action generator 108 can identify parameters such as a temperature setpoint for heating or cooling, fan speed, damper level, humidity level, lighting level, or window shades for one or more zones or regions at the site 142.

To determine one or more parameters of the site 142 to adjust to modify the load of the site 142, the data processing system can use data associated with the site (e.g., site data 122) or data collected from sensors 134 installed at the site 142. The data processing system 102 (e.g., via data collector 106) can receive data from sensors 134 that includes one or more of temperature information, humidity information, damper information, or fan speed information. The data processing system 102 can additional receive information from third-party data sources, such as remote data sources 144, that can include weather information. The data processing system 102 can select the one or more parameters for the site to adjust based on the sensor information, site data, and the weather information. For example, if the temperature at the site 142 is above a temperature setpoint, the BMS is set to cool the building, and the outside temperature is lower than the temperature at the site 142, the data processing system 102 can determine to open a damper to allow outside air to enter to cool the building, as opposed to having the BMS turn on the air conditioner.

Upon identifying the parameter of the BMS 132 to adjust in order to modify the load at the site 142, the data processing system 102 can determine a value to which to adjust the parameter. For example, the data processing system 102 can identify one or more constraints established for the site 142. Constraints can be stored in site data 122 in data repository 128. Constraints can include, for example, minimum or maximum allowable temperature setpoints, maximum $CO_2$ levels or other air quality metrics, minimum or maximum fan speeds, minimum or maximum damper levels, or minimum or maximum humidity levels. The constraints can be for a one or more time intervals or days of the week.

The data processing system 102 can identify a current value for the parameter (e.g., via a previously run status check script) and then determine a new value to which to adjust the parameter that modify the load of the site responsive to the detected grid event. For example, the data processing system 102 can determine that it is possible to lower the temperature setpoint without violating the minimum allowable temperature setpoint for the site 142, and then set the second value to the new temperature setpoint.

The action generator 108 can select a script from the scripts repository 120 that is responsive to the detected event and can control the identified one or more parameters. For example, if the event is a demand response event to modify the load of the site 142, and the parameter is to adjust the temperature setpoint, the action generator 108 can perform a lookup in the script repository 120 to select one or more scripts that are configured to adjust the temperature setpoint of the BMS 132 via the BMS interface 138 of the client device 130.

The scripts 120 can be generated and stored by the script generator 114. The script generator 114 may have previously generated and stored the scripts 120. Subsequent to generation of the scripts, the action generator 108 can select a script based on one or more constraints for the site 142, sensor information, or state information associated with the BMS 132. Thus, the action generator 108 can identify, based on the one or more parameters, a script constructed from previously processed interactions between a human-machine interface of the building management system to adjust the one or more parameters for the site.

The data processing system 102 can include a connection manager 110 designed, constructed and operational to establish, via network 101, a communication session with a remote access agent 136 executed by the client device 130 of the site 142. The connection manager 110 can receive an indication from the action generator 108 or other component of the data processing system 102 as to the IP address or other communication identifier of the remote access agent 136 or client device 130 in order to initiate a communication session with the remote access agent 136. The connection manager 110 can use any network protocol or technique to establish the communication session, including, for example, an internet protocol, serial line internet protocol, point-point protocol, point-to-point protocol over Ethernet, point-to-point tunneling, remote access service, remote desktop protocol, or an IP communication protocol. The connection manager 110 can apply network security to the communication security in which the data packets can be encrypted using, for example, transport layer security or other networks protocol.

The data processing system 102 (e.g., using the connection manager 110 or other component) can invoke, launch, or otherwise access the BMS interface 138. For example, the data processing system 102 can include a remote interface controller 112 designed, constructed and operational to input keyboard, mouse or other I/O inputs into the client device 130 in order to control one or more application executing on the client device 130. The remote interface controller 112 can instruct the remote access agent 136 to input keyboard, mouse, or other commands. The remote access agent 136 can simulate user input at the client device 130. The remote access agent 136 can take screenshots or screen grabs (e.g., via recorder 140) and provide the screen capture information to the data processing system 102 for processing and generation of commands.

The remote interface controller 112 can use the selected script to generate a sequence of commands defined by the script. The sequence of commands can adjust the one or more parameters for the site 142 to modify the electrical load of the site. The remote interface controller 112 can transmit a command to the remote access agent 136 in accordance with the script to cause the remote access agent 136 to perform the command to simulate user input (e.g., keyboard, mouse, touch interface or other user input). The commands can cause the remote access agent 136 to execute the sequence of commands the BMS interface 138, which can refer to a human-machine interface of the BMS 132.

The data processing system 102 can, via the remote interface controller 112 or data collector 106, obtain state information associated with the BMS 132 for the electrical and mechanical components the BMS 132 controls. The data processing system 102 can obtain the state information based on a time interval (e.g., every 10 minutes, 15 minutes, 30 minutes, 1 hour, 2 hours, 3 hours, etc.), based on an event, trigger or condition, or responsive to a request. In some cases, the data processing system 102 can determine to execute the status check script at a time when a script to adjust parameters of the BMS 132 is not being run so as not to interfere or detract from adjusting the parameter.

The remote interface controller 112 can execute a status check script. The status check script can include a sequence of commands to establish a connection or communication session with the remote access agent 136. The data processing system 102, via execution of the sequence of commands of the status check script, can instruct the remote access agent 136 to launch or otherwise invoke or bring to the foreground the BMS interface 138. The data processing system 102 can instruct the remote access agent 136 to obtain a screen shot of the BMS interface 138 and provide the screenshot back to the data processing system 102 for processing. If the BMS interface 138 includes multiple screens, tabs, or windows containing state information that is displayed at single time, the status check script can be configured to simulate user input at the client device 130 to cycle through the various screens of the BMS interface 138 and take screenshots of each for transmission to the data processing system 102. Thus, the data processing system 102 can obtain status information or state information of the electrical and mechanical components controlled by the BMS 132, as well as state information for the BMS 132. The data processing system 102 can process the screenshots to determine the state of the BMS 132. For example, the data processing system 102 can use an image recognition technique, optical character recognition, pattern recognition, or other image parsing or processing technique to determine the state information.

The data processing system 102 can terminate the communication session with the remote access agent 136. The data processing system 102 can terminate the communication session subsequent to transmission of the sequence of commands to the remote access agent 136. For example, the connection manager 110, which can establish the connection, can receive an indication from the remote interface controller 112 that execution of the script has completed and the remote access agent 136 has executed the sequence of commands defined by the script. The data processing system 102 can terminate the communication session so as to reduce network bandwidth, reduce security vulnerabilities, or reduce errors that may occur on the client device 130 due to conflating input commands from an operator of the client device 130 and the remote access agent 136.

In some cases, the communication session can be established such that it automatically terminates after a predetermined amount of time. For example, the communication session can be established with a time-to-live flag that sets the communication session to be open for an amount of time that is sufficient for the remote interface controller 112 to transmit the sequence of commands defined by the script. The time-to-live for the communication session can be fixed, or dynamically set based on the script selected by the action generator 108 responsive to the grid event, site constraints, and site data. The time-to-live can be, for example, 5 seconds, 10 seconds, 15 seconds, 30 seconds, 60 seconds, or other duration sufficient for the data processing system 102 to transmit the sequence of commands to the remote access agent 136. In some cases, the communication session can be configured to automatically terminate after a predetermined number of commands have been sent to the remote access agent 136. The communication session can be terminated either by the remote access agent 136, an operator of the client device 130, or the data processing system 102 (e.g., via the connection manager 110).

The data processing system 102 can execute the status check script to retrieve state information from the BMS 132 via BMS interface 138 responsive to termination of the communication session. For example, after the sequence of commands to adjust a parameter of the BMS 132 have been transmitted and executed by the remote access agent 136, the data processing system 102 can determine to execute a different sequence of commands defined by the status check script to retrieve state information from the building management system in order to validate or confirm that the parameters of the BMS 132 were adjusted in accordance with the selected script. If the data processing system 102 confirms that the parameters were properly adjusted (e.g., based on a state of the BMS interface 138 matching the expected state), then the data processing system 102 can terminate the session and enter a holding state until the next grid event is detected. If, however, the data processing system 102 determines that the state of the BMS 132 does not match the expected state in accordance with the selected script, the data processing system 102 can determine to re-execute the selected script in an attempt to properly adjust the parameter of the BMS 132 in order to modify the electrical load of the site 142 in response to the detected grid event. In some cases, the data processing system 102 can transmit an alert, notification or other indication to the operator of the client device 130 to indicate that the script failed to execute properly and to instruct the operator to manually make the adjustment to the BMS 132 so as to modify the load of the site 142.

The data processing system 102 can confirm, after execution of the selected script to modify the load of the site 142, that the actual electric load of the site 142 has been modified as intended by the script. The data processing system 102 can receive, from an electric meter sensor 134, the electric load or electricity consumption of the site 142 for a first time interval that is prior to execution of the script, and a second time interval subsequent to execution of the script. The first and second time intervals can be sufficient in duration so as to indicate an electric load of the site 142. For example, the first and second time intervals can be 1 minute, 2 minutes, 3 minutes, 5 minutes, 10 minutes, 15 minutes, 30 minutes, or other time interval that facilitates determining whether the executed script has reduced the electric load of the site as intended. The data processing system 102 can compare the electricity consumption after execution of the script with the electricity consumption prior to execution of the script to confirm whether the electric load of the site 142 was modified by the script in the intended manner. The intended modification can be, for example, an increase in electric load, decrease in electric load, or an increase or decrease by a desired amount (e.g., percentage of prior electric load or amount of kilowatts).

If the data processing system 102 determines that the modification of the electric load was not the desired or intended modification (e.g., the electric load increases when the intent of the script was to decrease the electric load), the data processing system 102 can trigger a second event to select a new script to revert the adjusted parameter to the previous setting so as to revert the electric load back to the prior level during the time interval prior to execution of the script that had the unintended modification to the electric load. By doing so, the data processing system 102 can perform error correction or avoid inadvertent modifications to the electric load. In some cases, the data processing system 102 can determine to select a different script in an attempt to modify the load in the originally intended manner responsive to the grid event that caused execution of the first script. The different script can cause a different adjustment to the parameter that was previously adjusted, or adjust a different parameter. For example, if the first script changed a damper level but that resulted in an increase in electric load as opposed to the desired reduction, the second script can revert the damper level back to the prior level, and a third script can adjust a fan speed instead of the damper level.

The data processing system 102 can generate a log of the execution of the script. The log can include a time stamp, date, site identifier, event that triggered the execution of the script, and information related to execution of the script. For example, the log can include information about whether the script successfully executed to completion, or whether the execution of the script was not successful. Successful execution can include the script executing the sequence of commands to adjust the parameter of the BMS. Unsuccessful execution can include the script not performing all of the commands to adjust the parameter of the BMS. Execution can be unsuccessful for various reasons, including, for example, the data processing system 102 losing access to the remote access agent 136 during execution. The execution can be unsuccessful to do an exception or error occurring on the client device 130, such as an application crashing, a prompt obfuscating the BMS interface, or other issue. The data processing system 102 can store the log for later processing. For example, the action generator 108 can process the log to determine the status of the execution of the script, and then determine whether to re-execute the script or execute another script, or generate an alert or instruction to resolve the logged issue.

Figure 2:
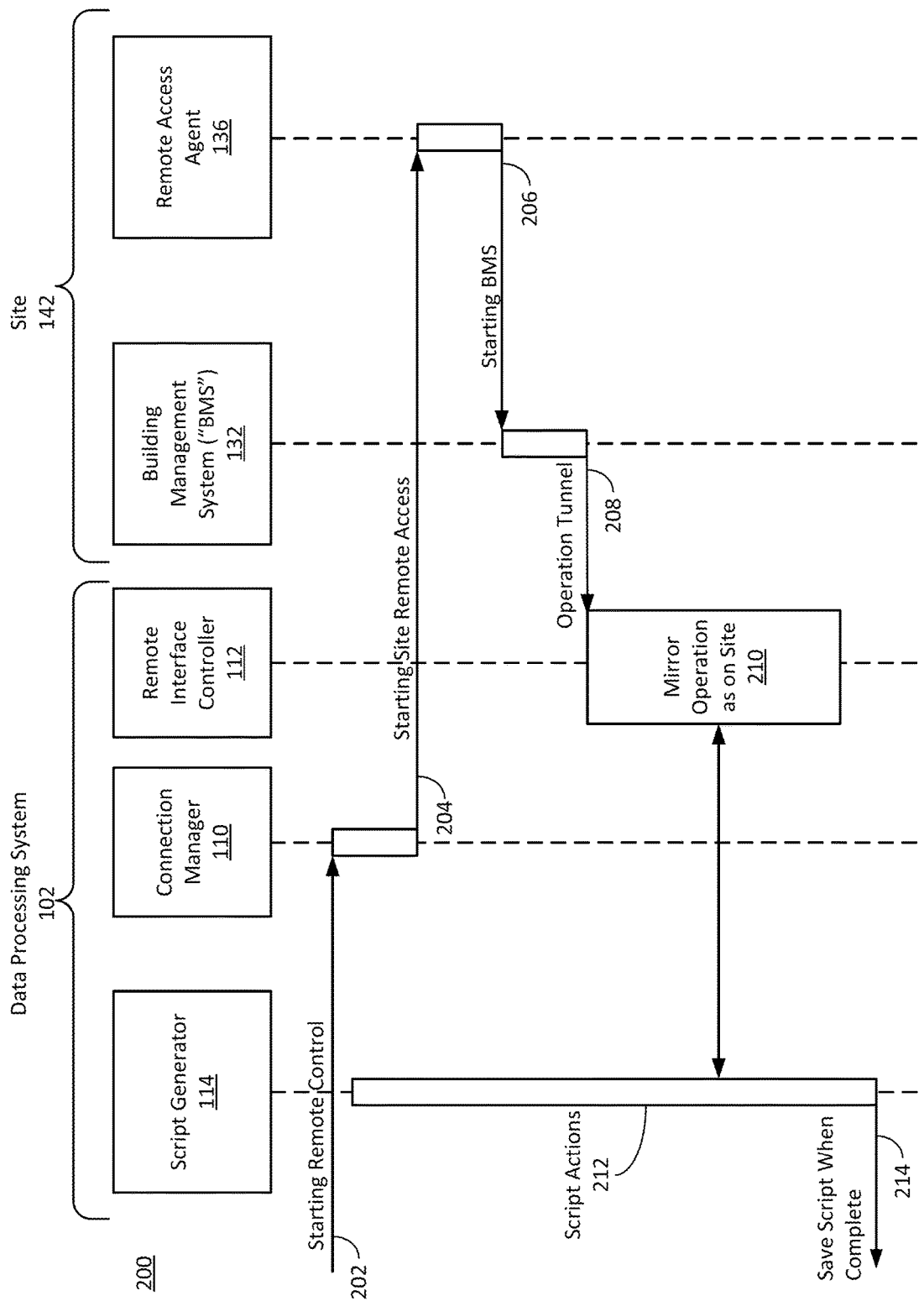
FIG. 2 is an illustration of an example operational flow for generating a script for responding to grid events, in accordance with an implementation.

FIG. 2 is an illustration of an example operational flow for generating a script for responding to grid events, in accordance with an implementation. The operational flow 200 can be performed by one or more system or component depicted in FIG. 1 or FIG. 7, including, for example, a data processing system, BMS, BMS interface, sensors, client device, or remote data source. At 202, the data processing system 102 can initiate or start remote control. Starting remote control can include or refer to an indication to begin generating a script configured to modify load at a site 142 responsive to a grid event. At 204, the connection manager 110 can establish a communication session with the remote access agent 136 executing on a client device 130 located at the site 142. The connection manager 110 can start a remote access procedure or protocol to establish the communication session or connection with the client device 130 via the remote access agent 136.

At 206, the data processing system 102, e.g., via connection manager 110 or other component of the data processing system 102, can instruct the remote access agent 136 to invoke, start or otherwise access the BMS 132 via the BMS interface 138. The remote access agent 136 can be configured with a command, application programming interface, keyboard shortcut, or simulated user input in order to access the BMS interface 138. For example, the remote access agent 136 can simulate a double click on the BMS icon on a desktop of the operating system of the client device 130. After launching the BMS 132, the data processing system 102 can wait a predetermined time interval (e.g., 30 seconds) to allow the BMS interface 138 to fully launch and be ready to receive input commands. The remote access agent 136 can launch a client application, such as a web browser, and navigate to a web page for the BMS 132. The remote access agent 136 can input site data including authentication credentials in order to access a SaaS or cloud-based version of the BMS interface 138 via the web browser.

At 208, an operational tunnel between the remote interface controller 112 and the BMS 132 can be established. The operational tunnel can refer to the data processing system 102 being able to adjust parameters of the BMS 132 via the BMS interface 138 that has been invoked on the client device 130 via the remote access agent 136. The data processing system 102 can execute the script with a sequence of actions to adjust to one or more parameters of the BMS 132 via the remote access agent 136.

At 210, the remote interface controller 112 can receive an indication of the interactions between the BMS 132 and the client device 130 executing the remote access agent 136. The interactions can correspond to user input. For example, the data processing system 102 can receive the indications from the remote access agent 136 or other macro recorder executing on the client device 130 that can detect or identify the user input and provide the indications of the user input to the data processing system 102 via the operation tunnel. The data processing system 102 (e.g., via the remote interface controller 112) can be configured to mirror or simulate the operations occurring on site.

At 212, the script generator 114 can generate a script with a sequence of commands that correspond to the remote interface controller 112 mirroring or simulating the user input on site. The remote interface controller 112 can use the sequence of commands to simulate the user input into the BMS 132, thereby controlling the BMS 132 in a manner similar to the operator of the client device 130. At 214, the data processing system 102 can store the script in a data repository for execution at a later time, such as responsive to a grid event.

Figure 3:
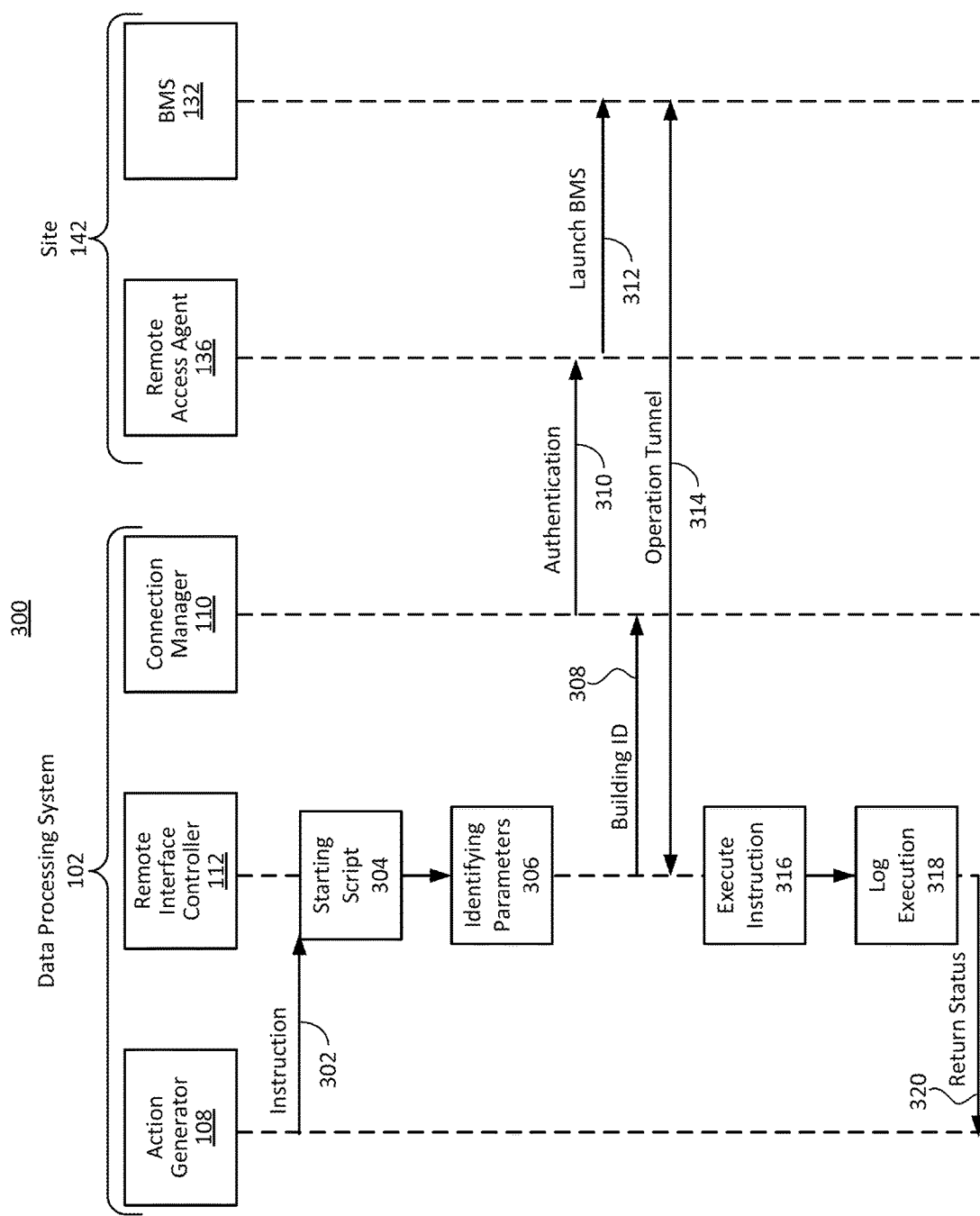
FIG. 3 is an illustration of an example operational flow for responding to grid events using a script, in accordance with an implementation.

FIG. 3 is an illustration of an example operational flow for responding to grid events using a script, in accordance with an implementation. The operational flow 300 can be performed by one or more system or component depicted in FIG. 1 or FIG. 7, including, for example, a data processing system, BMS, BMS interface, sensors, client device, or remote data source. At 302, the action generator 108 can generate an instruction or action to modify the electrical load at the site. The action generator 108 can generate the instructions responsive to an event, such as a grid event. The action generator 108 can select a script responsive to the detected event, and instruct the remote interface controller 112 to execute the script to adjust a parameter of the BMS of the site.

At 304, the remote interface controller 112 can start the script. The remote interface controller 112 can initiate execution of the script. At 306, the remote interface controller 112 can identify one or more parameters, such as the building identifier or site identifier, an IP address or other address of a remote access agent for the site, or other information used to establish a remote access session. The remote interface controller 112 can identify parameters of the BMS for the site to adjust to modify the electric load of the site. The remote interface controller 112 can communicate with the connection manager 110 to execute the communication session.

At 308, the remote interface controller 112 can provide the building identifier or other identifier of the site to the connection manager 110 to allow the connection manager to establish a remote access communication session with the client device or remote access agent 136 of the site. At 310, the connection manager 110 can establish a communication session with the remote access agent 136. To do so, the connection manager 110 can provide authentication information, such as a security token, authentication credentials, username, or password, for example. The connection manager 110 can perform a handshaking process with the remote access agent 136 to establish a secure communication session.

At 312, the remote access agent 136 can launch the BMS 132. The remote access agent 136 can receive an instruction or command from the data processing system 102 to launch the BMS. The remote access agent 136 can perform one or more sequence of actions on the client device 130 to launch the BMS 132. Launching the BMS 132 can include accessing a BMS interface of the BMS 132.

At 314, an operational tunnel between the data processing system 102 (e.g., remote access interface controller 112) and the BMS 132 can be established. The operational tunnel 314 can refer to a communication or connection path through which the data processing system 102 can adjust a parameter of the BMS 132. The operational tunnel or path can include the data processing system 102, the remote access agent 136 executed by the client device 130, a BMS interface 138 access by the client device 130, and the BMS 132 which can be controlled via the BMS interface 138.

At 316, the data processing system 102 can execute instructions, such as one or more sequence of commands to adjust one or more parameters of the BMS 132 for the site. The sequence of commands can be performed through the operational tunnel 314 between the remote interface controller 112 and the BMS 132. For example, the remote interface controller 112 can provide an instruction to the remote access agent 136 to simulate a user input into the BMS interface 138 to control the BMS 132.

At 318, the data processing system 102 can log the execution of the script. The log can include information about the time the script was executed, what parameters were adjusted using the script, whether there were any errors, alerts or exceptions during execution of the script, whether the script completed executing or execution was paused or terminated prior to completion, or any other information. The script may not complete execution for various reasons including, for example, i) a loss in the connection causing the operational tunnel 314 to break; ii) an exception occurring on the client device 130 that the script is not configured to handle (e.g., the BMS 132 crashing; a pop-up window being rendered in the foreground; the user taking over control of the client device 130 or interfering with the remote access agent 136 simulating user input); or iii) the client device 130 crashing or losing power and shutting off.

At 320, the status of the execution of the script can be returned to the action generator 108. The action generator 108 can receive the log file generated by the remote interface controller 112. The action generator 108 can determine the status of the execution of the script to determine whether to re-execute the script or execute another script. For example, if the status was unsuccessful, which can be determined based on the log file indicating there was an error or that execution of the script was terminated prior to completion, the action generator 108 can determine to re-start the script by returning to ACT 304. The data processing system 102 can store the status of the script execution in the data repository 128, such as in site data 122.

Figure 4:
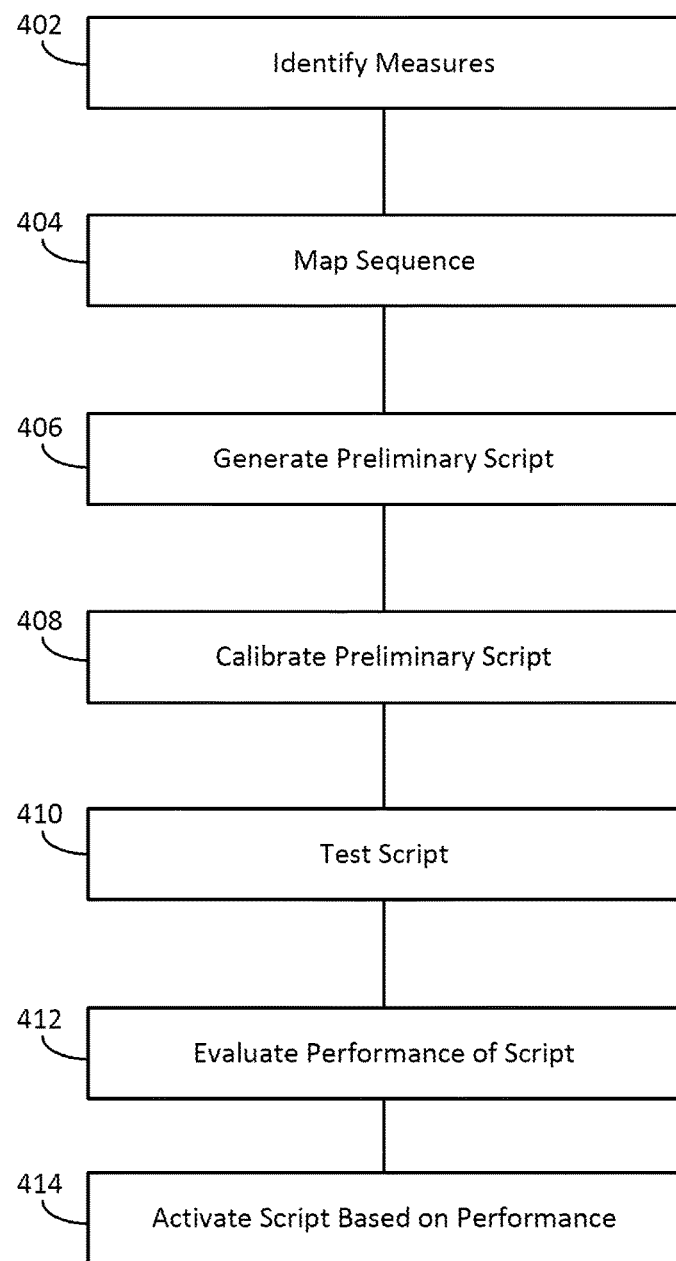
FIG. 4. is an illustration of an example method for generating a script for responding to grid events, in accordance with an implementation.

FIG. 4. is an illustration of an example method for generating a script for responding to grid events, in accordance with an implementation. The operational flow 400 can be performed by one or more system or component depicted in FIG. 1 or FIG. 7, including, for example, a data processing system, script generator, BMS, BMS interface, sensors, client device, or remote data source. At ACT 402, the data processing system can identify measures for a particular site. Measures can refer to or include load reduction measures. The load modification measures for the site can refer to how the electrical load of the site can be reduced or increased responsive to an event. Identifying load modification measures can be based on the HVAC or BMS configuration. Identifying load modification measures can be based on what types of parameters the BMS has for the site, and the constraints for those parameters. The constraints for the parameters indicate whether or to what extent an adjustment can be made to the parameter. The data processing system can determine how many parameters or settings can be adjusted for a site in order to modify the load. The data processing system can further determine types of events that can trigger the modification. The events can be external or based on an indication from a third party, such as a demand response event.

At 404, the data processing system can map a sequence. The sequence can refer to or include a sequence of actions or commands that, when taken, adjust the parameter to modify the electrical load of the site (e.g., reduce the electrical load or increase the electrical load). The data processing system can plan the sequence of actions or the logic sequence of measures identified at ACT 402 to modify the electrical load. The data processing system can plan the logic sequence based on the constraints established for the site (e.g., temperature setpoint constraints to maintain tenant comfort).

At ACT 406, the data processing system can generate a preliminary script. The data processing system can record an operator of the BMS interface conducting the sequence of actions that adjust the parameter of the BMS in order to modify the electrical load of the site. For example, a user can use a keyboard, mouse, or other user interface of a client device to interact with the BMS via the BMS interface. The data processing system can record the user manually entering input so as to generate a script that can simulate the user input to make the same or similar adjustment to the parameter of the BMS as the operator did. The data processing system can use a macro recorder, script generator, remote interface controller or other component or tool to record the manual user input in order to generate the preliminary script.

The data processing system can record the user manually making several different adjustments to several different parameters. For example, the data processing system can record the user making some or all of the adjustments identified at ACT 402 that can result in modifications of the electrical load at the site.

At ACT 408, the data processing system can calibrate the preliminary script. Calibrating the script can include, for example, determining whether the script causes the desired modification, identifying additional adjustments to the parameter that can improve the modification (e.g., a greater reduction or increase in the electrical load), identifying exceptions in the script and resolving them, or adding exception handling to the script. The data processing system can refine the script based on constraints, or other factors to facilitate executing the script responsive to a grid event.

For example, the data processing system can identify an exception in the recorded interactions used to generate the script. An exception can refer to a pop-up or other notification that was rendered on the client device during recordation of the script. An exception can include the operator navigating to an unrelated web page or application (e.g., an electronic mail application or web site) during the recording. The data processing system can calibrate the script by removing the interactions or actions associated with the exception from the script.

Exception handling can include identifying potential issues that can prevent the script from accurately and reliably adjusting the parameter, and then including a sequence of commands to resolve the issue. For example, if a pop-up window or notification is rendered during execution of the script, the data processing system can include a sequence of commands to either close the notification, or wait a predetermine time interval to allow the notification to disappear prior to continuing with executing the sequence of commands. The script can be configured to take screenshots and forward screenshots to the data processing system for image processing to identify a pattern. If the pattern matches the predetermined pattern corresponding to the BMS interface, then the data processing system can instruct the remote access agent to execute the sequence of actions to adjust the parameter of the BMS. However, if the screenshot corresponding to an unwanted pop-up window, the data processing system can instruct the remote access agent to close the pop-up window, wait until the pop-up window disappears, or otherwise bring the BMS interface to the foreground.

The data processing system can calibrate the script by using a machine learning model to identify adjustments to parameters that are different from the manual adjustment made the operator. The machine learning model can be trained with training data that includes an indication of the electric load of the site and values for parameters. The model can predict how an adjustment to one or more parameters modifies the load of the site. The data processing system can use the model to predict adjustments to parameters that modify the electric load beyond what was recorded. For example, the damper level was reduced by the operator from 18% to 15%, and that resulted in a load reduction, then the data processing system can input this data into the model to determine whether further reducing the damper to 13% or 10%, if permitted by the constraints for the site, would also result in the desired load reduction. If reducing the damper to 10% would result in a further load reduction, then the data processing system can calibrate the script to adjust the parameter for damper level to 10%, even though the manual recordation included an adjustment to only 15%, for a particular scenario (e.g., given outside temperature, grid event, occupancy, time of day, season, etc.).

At ACT 410, the data processing system can test the script. Testing the script can include executing the script by establishing a remote access control session, launching the BMS, executing the sequence of actions to adjust the parameter of the BMS, and terminating the session. The data processing system can execute a status check script to determine the state of the BMS to validate that the parameter was actually adjusted in accordance with the sequence of commands of the script. The data processing system can generate a log of the execution, and return a status of the execution of the script. In some cases, the data processing system can simulate execution of the script by establishing a virtual machine simulating the client device and remote access agent so as to adjust parameters without impacting the actual site. In some cases, the data processing system can execute the script with the actual site, but adjust the script for the purposes of testing to input the parameter adjustment but not perform the final step of activating the adjustment so that the BMS does not actual implement the change, thereby allowing the data processing system to test the script without modifying the load of the site.

At ACT 412, the data processing system can evaluate the performance of the script. The data processing system can analyze the log of the execution to determine the status of the execution. The data processing system can determine whether the script successfully executed, or whether there was an error during execution. The data processing system can determine whether the script resulted in the desired modification of the load of the site. The data processing system can receive additional sensor information for the site prior to and subsequent to execution of the script to determine the change in the electric load of the site. The data processing system can determine, based on the change in the electric load of the site, whether the script resulted in the desired modification to the electric load of the site.

At ACT 414, the data processing system can activate the script based on the performance. The data processing system can activate the script if the performance, which can refer to the modification of the electrical load of the site, corresponds to the desired or expected modification. For example, if the script was constructed to reduce electrical load of the site, but the result was an increase in electrical load of the site or no change in the electrical load of the site, then the data processing system can determine to not activate the script. If the script was constructed to reduce the electrical load of the site, and the result was a reduction in the electrical load of the site, then the data processing system can activate the script. Activating the script can refer to storing or saving the script in a data repository of the data processing system to allow the data processing system to select the script responsive to a grid event and execute the script.

Figure 5:
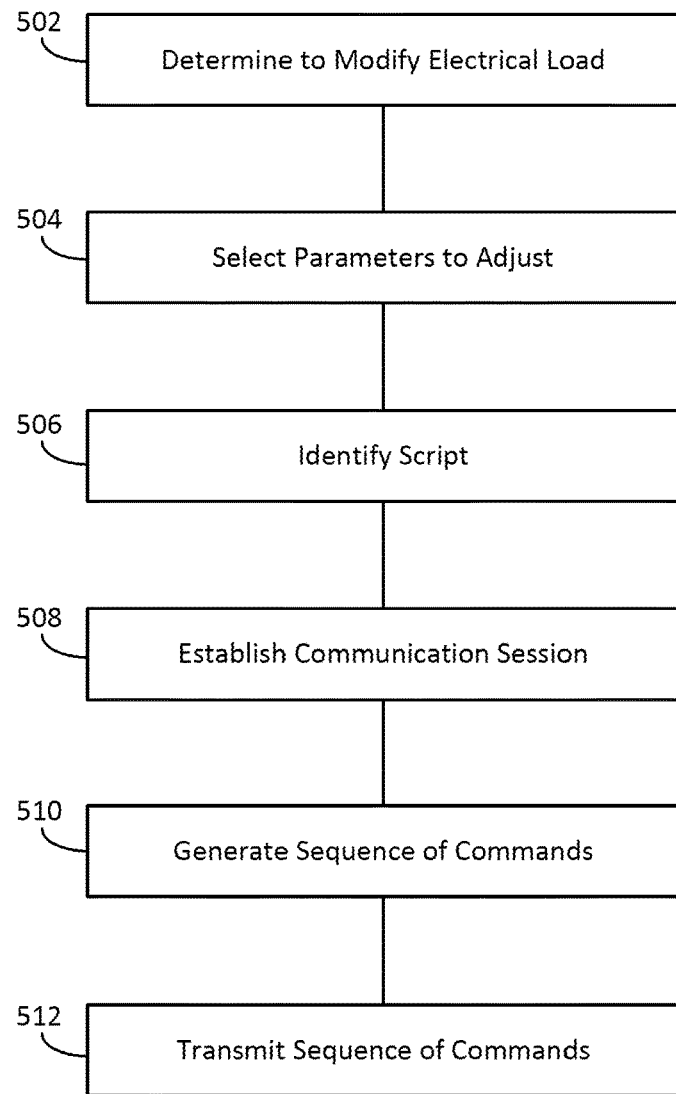
FIG. 5 is an illustration of an example method for responding to grid events, in accordance with an implementation.

FIG. 5 is an illustration of an example method for responding to grid events, in accordance with an implementation. The method 500 can be performed by one or more system or component depicted in FIG. 1 or FIG. 7, including, for example, a data processing system, BMS, BMS interface, sensors, client device, or remote data source. At ACT 502, the data processing system can determine to modify (e.g., reduce or increase) the electrical load of a site. The data processing system can receive an indication or notification from a third party, such as a utility provider, of a demand response event. The data processing system can determine to reduce the electrical load responsive to a rate change for the electricity. In some cases, the data processing system can predict or forecast the event, such as based on a model.

At ACT 504, the data processing system can select one or more parameters of the BMS of the site to adjust. The data processing system can determine the parameters to adjust based on a current state of the site, constraints, and data from sensors. For example, the data processing system can determine that reducing a temperature setpoint, fan speed, damper level, or humidity setting can modify the electrical load of the site. The data processing system can determine which parameters to adjust based on a model or other logic, heuristic, policy, or rule.

At ACT 506, the data processing system can identify or select a script that is configured to adjust the parameter selected at ACT 504. The data processing system can select a script that includes a sequence of commands to control a BMS of the site via the BMS interface. The script can simulate user input at a client device of the site used to access the BMS. The script can be generated based on previously recorded manual operator input into a GUI of the BMS.

At ACT 508, the data processing system can establish a communication session with a client device of the site. The client device can be used to control the BMS. The data processing system can establish the communication session with a remote access agent executing on the client device. The data processing system can use an identifier, IP address, or other address or identifier of the remote access agent in order to communicate with the remote access agent to establish the session.

At ACT 510, the data processing system can generate a sequence of commands defined by the selected script at ACT 506 to adjust the parameter identified at ACT 504. The data processing system can generate the sequence of commands to adjust the a parameter to a desired value. The data processing system can execute the script to generate the commands. The commands can simulate user input to control the BMS.

At ACT 512, the data processing system can transmit the sequence of commands to the client device. The remote access agent executing on the client device can receive the sequence of commands, and simulate user input in accordance with the sequence of commands. The simulate user input can be provided to the BMS interface and adjust the parameter of the BMS. After transmitting the commands to adjust the BMS, the data processing system can terminate the communication session with the remote access agent. The data processing system can generate a log of the execution of the script with information associated with the execution of the script, including, for example, a site identifier, a time stamp, date stamp, duration of the execution, trigger event, parameter information, and status of the execution.

Figure 6:
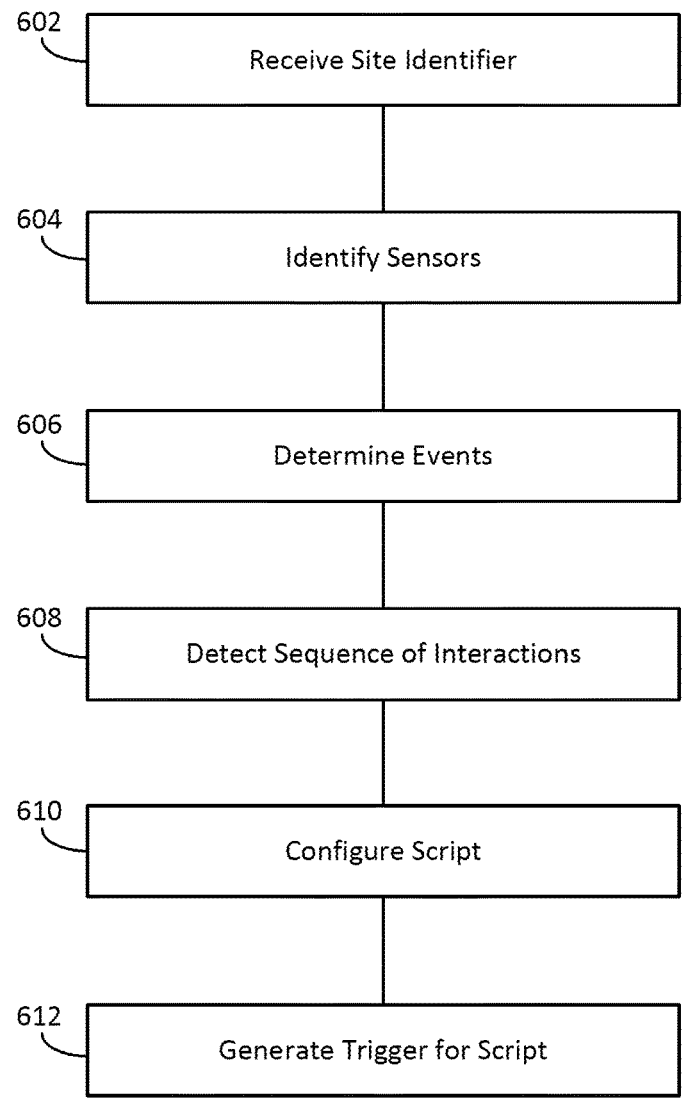
FIG. 6 is an illustration of an example method for generating script for responding to grid events, in accordance with an implementation.

FIG. 6 is an illustration of an example method for generating script for responding to grid events, in accordance with an implementation. The operational flow 600 can be performed by one or more system or component depicted in FIG. 1 or FIG. 7, including, for example, a data processing system, BMS, BMS interface, sensors, client device, or remote data source. At ACT 602, the data processing system can receive a site identifier. The data processing system can receive site information that can include a unique identifier of the site, location of the site, configuration of the site, or other site data. At ACT 604, the data processing system can identify the types of sensors configured at the site. The sensors can be sensors established or installed by an operator or administrator of the data processing system. The sensors can be internet of things ("JOT") sensors. The sensors can be configured to transmit information via a network to the data processing system. The data processing system can identify the types of sensors, and where they are installed at the site. The data processing system can receive a sensor configuration file, or other input with the sensor information. In some cases, the data processing system can ping or poll the sensors via the network to determine sensor information. In some cases, the sensors can push information to the data processing system.

At ACT 606, the data processing system can determine events for the site. Events can include what can trigger modification of the load at the site, and what measures to take to modify the load of the site. For example, based on the configuration of the site (e.g., type of HVAC system, BMS, sensors, and available third party information from remote data sources), the data processing system can determine what types of events (e.g., grid events, demand response events, rate changes, weather information, traffic information, etc.) can trigger load modification, as well as what types of parameters (e.g., temperature setpoints, humidity level, fan speed, damper level, carbon dioxide setpoint, window shades, etc.) can be adjusted in order to modify the electrical load for the site.

At ACT 608, the data processing system can detect or record a sequence of interactions for each of the events identified at ACT 606. The sequence of interactions can be performed by an operator of a BMS that manages the site. The sequence of interactions can include user input into a graphical user interface or other user interface of the BMS. The user interface of the BMS can be accessed by a client device. The data processing system can detect or record a sequence of interactions for each type of parameter or each adjustment to a parameter. For example, if an event is to reduce the load for the site, the data processing system can record one or more ways of reducing the load for the site based on adjustment of one or more parameters of the site. For example, the data processing system can record adjustments to the temperature setpoint, damper level, humidity level, fan speed, window shades, or other parameter adjustments. The data processing system can record a separate sequence of interactions for each parameter. The data processing system can record the sequence of interactions using a macro recorder or other program, script, component or tool executing on the client device that access At ACT 610, the data processing system can configure a script. The data processing system can generate or configure a script with the sequence of interactions. The data processing system can generate separate scripts for each parameter or each adjustment to the parameter. The data processing system can generate one or more scripts to adjust one or more parameters. The script can be configured to establish a communication session with the client device of the site, launch the BMS, and simulate the user input to adjust the parameter defined by the script.

At ACT 612, the data processing system can generate a trigger for the script. The trigger can correspond to a grid event responsive to which the script can modify the load of the site. The trigger event can include, for example, a demand response event, peak coincidence event, rate increase or decrease, or other grid event. The data processing system can associate the script with the trigger event such that the data processing system can select, responsive to the grid event, the script in order to modify the electrical load of the site by adjusting the parameter defined by the script.

Figure 7:
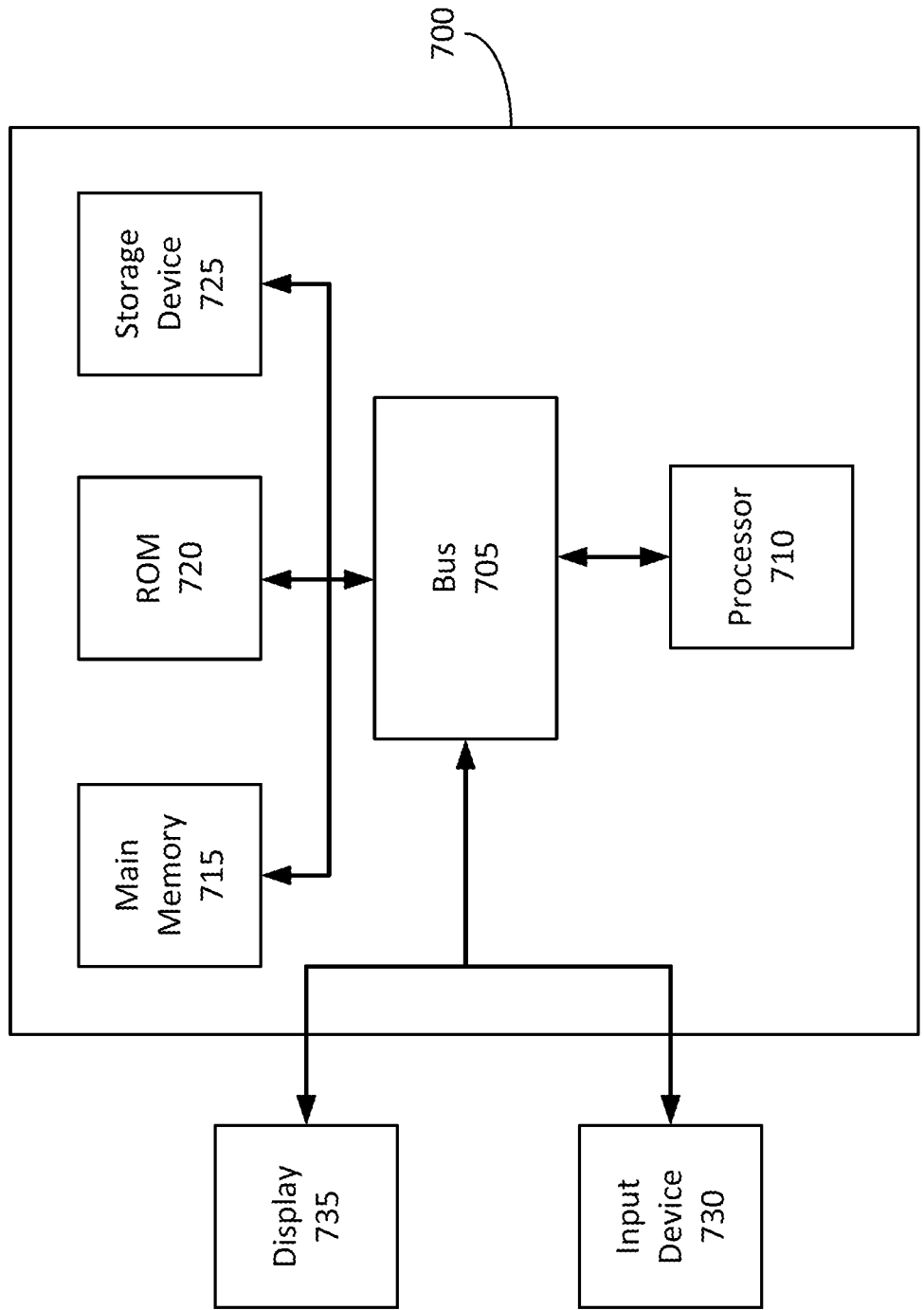
FIG. 7 is a block diagram illustrating an architecture for a computer system that can be employed to implement elements of the systems and methods described and illustrated herein, including, for example, the system depicted in FIG. 1 and the operational flows or methods depicted in FIGS. 2-6.

FIG. 7 is a block diagram of an example computer system 700. The computer system or computing device 700 can include or be used to implement the system 100, or its components such as the data processing system 102. The computing system 700 includes a bus 705 or other communication component for communicating information and a processor 710 or processing circuit coupled to the bus 705 for processing information. The computing system 700 can also include one or more processors 710 or processing circuits coupled to the bus for processing information. The computing system 700 also includes main memory 715, such as a random access memory (RAM) or other dynamic storage device, coupled to the bus 705 for storing information, and instructions to be executed by the processor 710. The main memory 715 can be or include the data repository 128. The main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions. The storage device 725 can include or be part of the data repository 128.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information and command selections to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 can be part of the data processing system 102, the client device 130 or other component of FIG. 1, for example.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, data collector 106, action generator 108, connection manage 110, remote interface controller 112, script generator 114, and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 700 can include clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client device 130, sensors 134, or the remote data source 144).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the data collector 106 and action generator 108 can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to respond to electric events, comprising:
a data processing system comprising memory and one or more processors to:
receive a site identifier for a site managed by a building management system separate from the data processing system, the site comprising a computing device used to control the building management system via a human-machine interface of the building management system;
identify a plurality of sensors installed at the site, the plurality of sensors to transmit data to the data processing system;
determine, based on a configuration of the building management system and the plurality of sensors installed at the site, a plurality of events for the site;
detect, responsive to a first event in the plurality of events, a sequence of interactions to control one or more parameters of the building management system via the human-machine interface;
configure a script based on the sequence of interactions, the script to i) establish a communication session with the computing device, ii) invoke the building management system, and iii) execute the sequence of interactions via the human-machine interface of the building management system; and
generate, based on the first event, a trigger for the script to cause execution of the script responsive to the first event.

2. The system of claim 1, comprising:
the data processing system to detect the sequence of interactions via a macro recorder executed by the computing device.

3. The system of claim 1, comprising the data processing system to:
determine a type of each of the plurality of sensors installed at the site, the type comprising at least one of a temperature sensor, humidity sensor, actuator sensor, or fan speed sensor; and
determine the plurality of events for the site based on the type of each of the plurality of sensors.

4. The system of claim 1, comprising the data processing system to:
identify one or more remote data sources that provide information for the site; and
determine the plurality of events for the site based on a type of information provided by the one or more remote data sources for the site.

5. The system of claim 1, comprising the data processing system to:
detect, upon execution of the script, an exception that occurs via an application that executes on the computing device that is different from the human-machine interface of the building management system; and
update the script to address the exception.

6. The system of claim 5, wherein the exception comprises a prompt window generated by the application that is different from the human-machine interface of the building management system.

7. The system of claim 5, comprising:
the data processing system to detect the exception using an image recognition technique.

8. The system of claim 5, comprising:
the data processing system to update the script with a second sequence of interactions to remove the exception.

9. The system of claim 1, comprising the data processing system to:
detect, upon execution of the script and via the human-machine interface of the building management system, a state of the building management system; and
update the script to proceed with execution of the sequence of interactions responsive to the state of the building management system.

10. The system of claim 1, comprising the data processing system to:
determine a first electrical load of the site prior to the trigger;
detect the trigger for the script and execute the script to perform the sequence of interactions via the human-machine interface;
determine a second electrical load of the site subsequent to execution of the script; and
activate the script for the trigger for the site responsive to a determination that the second electrical load is less than the first electrical load.

11. The system of claim 1, comprising the data processing system to:
determine a first electrical load of the site prior to the trigger;
detect the trigger for the script and execute the script to perform the sequence of interactions via the human-machine interface;
determine a second electrical load of the site subsequent to execution of the script; and
block activation of the script for the trigger for the site responsive to a determination that the second electrical load is greater than or equal to the first electrical load.

12. The system of claim 1, comprising the data processing system to:
identify a plurality of constraints for the site; and
generate the script to control the one or more parameters of the building management system based on the plurality of constraints for the site.

13. The system of claim 1, comprising the data processing system to:
determine, via a model trained with a machine learning technique, an adjustment to the one or more parameters responsive to the first event based on a plurality of constraints for the site, the plurality of sensors for the site, and historical electrical load for the site; and
configure the script with the adjustment to reduce electrical load for the site responsive to the trigger.

14. The system of claim 1, wherein the one or more parameters correspond to at least one of a temperature set point, humidity set point, damper level, or fan speed.

15. A method of responding to electric events, comprising:
receiving, by a data processing system comprising memory and one or more processors, a site identifier for a site managed by a building management system separate from the data processing system, the site comprising a computing device used to control the building management system via a human-machine interface of the building management system;
identifying, by the data processing system, a plurality of sensors installed at the site, the plurality of sensors to transmit data to the data processing system;
determining, by the data processing system, based on a configuration of the building management system and the plurality of sensors installed at the site, a plurality of events for the site;
detecting, by the data processing system, responsive to a first event in the plurality of events, a sequence of interactions to control one or more parameters of the building management system via the human-machine interface;

configuring, by the data processing system, a script based on the sequence of interactions, the script to i) establish a communication session with the computing device, ii) invoke the building management system, and iii) execute the sequence of interactions via the human-machine interface of the building management system; and generating, by the data processing system based on the first event, a trigger for the script to cause execution of the script responsive to the first event.

16. The method of claim 15, comprising:

detecting, by the data processing system, the sequence of interactions via a macro recorder executed by the computing device.

17. The method of claim 15, comprising:

determining, by the data processing system, a type of each of the plurality of sensors installed at the site, the type comprising at least one of a temperature sensor, humidity sensor, actuator sensor, or fan speed sensor; and determining, by the data processing system, the plurality of events for the site based on the type of each of the plurality of sensors.

18. The method of claim 15, comprising:

identifying, by the data processing system, one or more remote data sources that provide information for the site; and determining, by the data processing system, the plurality of events for the site based on a type of information provided by the one or more remote data sources for the site.

19. The method of claim 15, comprising:

detecting, by the data processing system upon execution of the script, an exception that occurs via an application that executes on the computing device that is different from the human-machine interface of the building management system; and updating, by the data processing system, the script to address the exception.

20. The method of claim 15, comprising:

determining, by the data processing system, a first electrical load of the site prior to the trigger;

detecting, by the data processing system, the trigger for the script and execute the script to perform the sequence of interactions via the human-machine interface;

determining, by the data processing system, a second electrical load of the site subsequent to execution of the script; and activating, by the data processing system, the script for the trigger for the site responsive to a determination that the second electrical load is less than the first electrical load.

* * * * *